United States Patent
Aso et al.

(10) Patent No.: US 6,522,818 B1
(45) Date of Patent: Feb. 18, 2003

(54) METHOD FOR EFFICIENT FOUR-WAVE MIXING GENERATION AND SHORT PULSE GENERATION EQUIPMENT USING THE METHOD

(75) Inventors: Osamu Aso, Tokyo (JP); Masateru Tadakuma, Tokyo (JP); Shu Namiki, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 0 days.

(21) Appl. No.: 09/536,713

(22) Filed: Mar. 28, 2000

(30) Foreign Application Priority Data

Mar. 29, 1999 (JP) .......................................... 11-085968
Aug. 26, 1999 (JP) .......................................... 11-239222

(51) Int. Cl.[7] ................................................. G02B 6/00
(52) U.S. Cl. ........................ 385/122; 385/123; 359/160; 359/161; 359/341.1; 359/341.3
(58) Field of Search ................................ 385/122, 123, 385/124, 126; 372/21; 359/160, 161, 156, 341, 345

(56) References Cited

U.S. PATENT DOCUMENTS

| 5,596,667 | A | * | 1/1997 | Watanabe | 385/122 |
| 5,694,239 | A | * | 12/1997 | Shigematsu et al. | 359/332 |
| 5,798,853 | A | * | 8/1998 | Watanabe | 359/160 |
| 6,163,638 | A | * | 12/2000 | Eggleton et al. | 385/37 |
| 6,175,435 | B1 | * | 1/2001 | Watanabe | 359/161 |

OTHER PUBLICATIONS

"CW Three–Wave Mixing in Single–Mode Optical Fibers"—J. Appl. Phys.—49 (10), Oct. 1978 (pp. 5098–5106).

"Four–Photon Parametric Mixing in Optical Fibers: Effect of Pump Depletion"—Optics Letters, vol. 14, No. 1, Jan. 1, 1989 (pp. 87–89).

R. Stolen, et al.—"Parametric Amplification and Frequency Conversion in Optical Fibers"—IEEE, vol. Q3–18, No. 7, Jul. 1982 (pp. 1062–1072).

G. Cappellini. et al.—"Third–Order Three–Wave Mixing in Single–Mode Fibers: Exact Solutions and spatial instability Effects"—J. Opt. Soc. Am. B, vol. 8, No. 4, Apr. 1991 (pp. 824–838).

S. Watanabe, et al.—"Simultaneous Wavelength Conversion and Optical Phase Conjugation of 200 . . . "—ECOC 97, Sep. 22–25, 1997, Conference Publication No. 448 (pp. 1–4).

(List continued on next page.)

*Primary Examiner*—Hemang Sanghavi
*Assistant Examiner*—Scott A Knauss
(74) *Attorney, Agent, or Firm*—Armstrong, Westerman & Hattori, LLP

(57) ABSTRACT

The present invention provides a method for generating four-wave mixing to obtain idler light with high efficiency, in which the range of lengths of an optical fiber is appropriately set, and probe light and pumping light, having different frequencies, are launched into the optical fiber. When the nonlinear coefficient of the optical fiber, the loss per unit distance, and the wavelength and intensity of the probe light and pumping light are set to certain values, the idler light conversion efficiency at the output end of the optical fiber is a periodic function with respect to optical fiber length having a maximal value and a minimal value. The maximum length of the optical fiber to be used to obtain four-wave mixing is set to be equal to or less than the length Lmax (Lmax=Lm+ΔL) which is given by adding the length of the optical fiber Lm, at which the idler light conversion efficiency takes on the first maximal value in the aforementioned periodic function and distance ΔL or 10% of Lm.

14 Claims, 20 Drawing Sheets

OTHER PUBLICATIONS

Wanatabe—"Broadband Wavelength Conversion and Optical Phase Conjugation Using a Highly Nonlinear Fiber Fourwave Mixer"—OECC '98, Technical Digest, Jul. 1998 (pp. 84–85).

Watanabe et al.—"Interband Wavelength Conversion of 320 Gb/s (32×10 Gb/s) WDM Signal Using Apolarization–Insensitive Fiber Four–Wave Mixer"—OCOC'98 Sep. 20–24, 1998, Madrid, Spain (pp. 85, 87).

Kagi et al.—"Fibre Optical Parametric Amplifier Operating Near Zero–Dispersion Wavelength"—Electronics Letters, Oct. 26, 1995, vol. 31, No. 22 (pp. 1935–1937).

Yamamoto et al.—"Highly Efficient Four–Wave Mixing in an Optical Fiber with Intensity Dependent Phase Matching",—IEEE Photonics Technologies Letters, vol. 9, No. 3, Mar. 1997 (pp. 327–329).

Inoue—"Polarization Effect on Four–Wave Mixing Efficiency in a Single–Mode Fiber"—IEEE Journal of Quantum Electronics, vol. 28, No. 4, Apr. 1992 (pp. 883–894).

Aso—"Measurement of a Parameter Limiting the Analysis of the First–Order Polarization–Mode Dispersion Effect"—Optic Letters, vol. 23, No. 14—Jul. 1998 (pp. 1102–1104).

Chernikov et al.—"Comblike Dispersion–Profiled Fiber for Soliton Pulse Train Generation"—Optical Letters. vol. 19, No. 8—Apr. 15, 1994 (pp. 539–541).

Chernikov et al.—"Integrated All Optical Fibre Source of Multigigahertz Soliton Pulse Train"—Electronics Letters, vol. 29, No. 20—Sep. 30, 1993 (pp. 1788–1789).

* cited by examiner

METHOD FOR EFFICIENT FOUR-WAVE MIXING GENERATION AND SHORT PULSE GENERATION EQUIPMENT USING THE METHOD

FIELD OF THE INVENTION

The present invention relates to a method for generating four-wave mixing and apparatus for short pulse generation using the method, which provides four-wave mixing in an optical fiber to generate frequency converted light and which is used in fiberoptic non-linear device such as a fiberoptic wavelength converter, a fiberoptic optical parametric amplifier, and a fiberoptic optical phase conjugation generator.

BACKGROUND OF THE INVENTION

The four-wave mixing in an optical fiber is generated, resulting from the third-order non-linear polarization of a fiber material. The present application discusses in particular the phenomenon in which idler light (converted light) of a frequency fc (=2fp−fs) is generated when probe light (or signal light) of a frequency fs and pumping light of a frequency fp present. Using four-wave mixing would make it possible to generate a frequency converted light of a desired frequency fc by creating pumping light at an appropriate frequency fp on the frequency axis for inputted signal light of a frequency fs. A device that implements generating four-wave mixing with high generation efficiency is used as fiberoptic non-linear device in the field of optical communications. Specific ways of using it include an optical wavelength converter [1–6], an optical parametric amplifier (OPA) [8–11], the compression of pulses [2], the generation of phase conjugated light [7], an optical signal regeneration circuit [12], and a multi-wavelength optical source [13] to be used in wavelength division multiplexing communications. Incidentally, in the specification of the present application, a number in [ ] denotes the number of a literature shown in the list attached to the specification of the present invention.

The above-mentioned phenomenon takes place when pumping light is present at two different frequencies f1 and f2. Hereinafter in this specification, for the sake of convenience, the phenomenon in which the pumping light is present at one frequency is referred to as the three wave mixing (TWM), while the phenomenon in which the pumping light is present at two different frequencies is referred to as the four wave mixing. Both phenomena are discussed in the same frame in which four photons interact with one another from the viewpoint of quantum theory. Therefore, it is to be understood that when a discussion that applies to both occurs, the phenomenon is called four-photon mixing (FPM) collectively.

In general, it is possible to implement the FPM under optimum circumstances by allowing the zero dispersion wavelength of a fiber and the wavelength of pumping light to coincide with each other on the wavelength axis. This is because the phase mismatch of the propagation constant β is minimized [8]. In the case where the dispersion of an optical fiber at the wavelength of pumping light lies in anomalous dispersion region and the pumping light power is sufficiently intense, the effects of the self phase modulation (SPM) and the cross phase modulation (XPM) would cause a variation of the phase matching condition. It was also confirmed that this allowed the phase matching to be achieved, depending on the intensity of pumping light in the anomalous dispersion region of an optical fiber [14].

Devices that employ the FPM in the optical fiber have a variety of applications. For example, such applications may include wavelength conversion in terms of the construction of an optical network in wavelength division multiplexing communications. In this case, it is desired to convert, multi channels signal light in a broad bandwidth with conversion efficiency less dependent on wavelength and with small loss due to the conversion [4]. This is physically equivalent to generate the third-order non-linear effect in an optical fiber in a broader bandwidth with higher efficiency. For the sake of this purpose, the following two methods and their combination are conceivable. (1) Non-linear effect is generated by launching the high-power pump light into the fiber or by using an optical fiber having enhanced non-linearity per unit length. (2) The fiber is elongated to provide light with more time for performing non-linear interaction in the optical fiber in order to generate non-linear effect. Among these two ways of thinking, the idea (1) is very important.

Making the fiber shorter would lead to prevent variations of dispersion in the fiber. In literatures [6, 7], to compensate for the shortage in length of the interaction, three highly nonlinear dispersion shifted optical fibers (HNL-DSF), each 250 m tin length and having the zero dispersion wavelength substantially at the same point of frequency, are prepared and connected to each other to realize a long fiber (a length for nonlinear interaction of light in the fiber). Enhanced non-linearity of each of the optical fibers can generate effective FPM even in a fiber having a total length of as much as 750 m.

Making the fiber shorter provides other various advantages such as the prevention of the stimulated Brillouin scattering, the prevention of degradation of FPM generating efficiency due to a difference in polarization and reduction in loss, which are currently considered to have practically the advantage over (2) mentioned above. As described in the foregoing, it is possible to implement a fiberoptic device actively employing FPM such as wavelength converter or OPA by shortening an optical fiber or a FPM medium. Nowadays, highly nonlinear optical fiber s are eagerly being developed in order to provide the shortened optical fiber with greater non-linearity [15–17].

When the aforementioned highly nonlinear optical fiber is used to produce a wavelength converter, the wavelength converter is to be produced by combining a highly nonlinear optical fiber having a given length and given non-linearity per unit length and the light source of pumping light having the maximum output limited by its specification. The conditions must be conceived for constituting a wavelength converter that satisfies the desired characteristics with the given fiber and light source.

Concerning this problem, for example in literatures [1–3], the inventors have provided a solution of giving the minimum value of the intensity of pumping light to be inputted with the fiber being kept constant in length. This minimum value corresponds to the threshold value of the pumping light required to generate optical parametric amplification in an anomalous dispersion region of the optical fiber. More specifically, this threshold value is determined by the frequency of the signal light and pumping light at the time of generating TWM and the propagation constant of light in the fiber, shown by the following equation using the phase mismatch Δβ of the propagation constant and the non-linear coefficient γ of the fiber.

That is, $$P_p \geq P_{th} = -\Delta\beta/(4\gamma) \tag{1}$$

Wavelength conversion with high conversion efficiency can be realized by setting the pumping light intensity $P_p$ to be greater than the threshold value. $\Delta\beta<0$ is achieved only when the dispersion of the fiber at the wavelength of the pumping light is in the anomalous dispersion region and equation (1) is significant (under the conditions). The above-mentioned fact can be in principle derived from an approximate solution [8, 9] of the TWM given by Stolen and Bjorkholm.

OBJECTS AND SUMMARY OF THE INVENTION

However, when the aforementioned discussion is conducted, it is necessary to note that the input pumping light cannot be intensified without ant restrictions. The limit is a value stipulated by the specification of the light source. When the output power of the pumping light source at hand is equal to or less than $P_{th}$, the aforementioned wavelength conversion cannot be realized. In addition, it is also impossible to allow too intense light to be launched into an optical fiber because of the stimulated Brillouin scattering (SBS).

Next, even with a highly nonlinear optical fiber, it is impossible to shorten the length of the optical fiber infinitesingally. It is necessary to determine the fiber length just enough to allow light to interact nonlinearly in the fiber with the input pumping light of a limited intensity of Pp. It is natural that the longer a fiber in length, the longer the time for allowing light to made non-linear interaction sufficiently. Therefore, as long as the output of the pumping light source is finite, a certain length of the fiber is inevitable to generate FPM effectively. In fact, in the foregoing literatures [6, 7], three optical fibers are connected to realize a fiber length long enough to make the sufficient nonlinear interaction.

It has not been pointed out to what extent the fiber can be shortened or in other words, to what extent the fiber has to be elongated. For example, as can be seen in the aforementioned equation (1), the fiber length does not appear in the equation as a parameter. Therefore, it is impossible to obtain significant information regarding an optimum length of the fiber from the equation (1).

Another reason why the length of the fiber must be shortened is related to the problem of the polarization mode dispersion (PMD). The meaning of this problem is slightly different from the PMD referred in the field of the optical communications. As a matter of course, it is also desirable to have reduced PMD in the context of prevention of degradation of signal light in the optical communications. What is in particular meant here is the problem of the effects of PMD that deteriorates generating the efficient and broad band FPM. According to the analysis conducted by Inoue [18], in the generation of idler light by the FPM, the highest efficiency can be realized in the case where the pumping light and the probe light have the same state of polarization. However, it is shown that a certain combination of the state of polarization of the pumping light and prove light would provide zero idler light (that is, no idler light is generated). Therefore, in the configuration such as the wavelength converting device or OPA, lit is a critical problem how to coincide the state of polarization with each other.

Now, suppose that the state of polarization of the pumping light and probe light is allowed to coincide with each other at the input end of the fiber. If the optical fiber is a polarization maintaining fiber, no problem would arise since the same polarization state is preserved as it is as far as the output end of the fiber. In fact, in literatures [4, 5], a broadband wavelength converter is developed in this manner. However, what if the polarization maintaining fiber is not used (in truth not used in general)? In general, paying attention to light of a certain frequency, for example, pumping light would teach that the state of polarization is changed by fiber to birefringence while propagating along the fiber. Any state of polarization can be represented by the superposition of a pair of orthogonal polarization. Here, as this orthogonal state of polarization, the principal state of polarization (PSP) can be selected in general [19,20]. It is possible to represent an input polarization state (an arbitrary polarization state) by superposition of the PSP by an appropriate amount of phase shift $\phi$. Now, suppose that an arbitrary polarization state is launched into a fiber. The phase shift between PSPs being $\phi$ at the input end of the fiber becomes $\phi p = \phi + 2 \ c \ \Delta\tau/\lambda p$ at the output end of the fiber. C is the speed of light in vacuum. Here, it is assumed that $\Delta\tau$ is PMD of the optical fiber and constant for the sake of simplicity. Suppose that $\lambda p$ is the wavelength of the pumping light. That is, since a polarization state that is formed represented by the superposition of PSPs with phase $\phi p$ appears at the output end, the state of polarization at the output end is different from that at the input end in general. On the other hand, letting the wavelength be the probe light of $\lambda s$ allows the similar discussion consequently the phase at the output end $\phi C \ s = \phi + 2 \ \pi\Delta\tau C/\lambda C \ s$. In general, unless $\lambda s = \lambda p$, then $\phi p \neq \phi s$. From the foregoing discussion, even when beams of light of the same polarization state are launched into the input end of the fiber, the state of polarization of the two light waves output from the fiber is different. This problem becomes more serious as the difference between the $\lambda s$ and $\lambda p$ is made greater to implement a broadband wavelength conversion or OPA. This is only because of the difference between $\phi p$ and $\phi s$ becomes larger. In general, $\Delta\tau$ is dependent on the wavelength and PSP is also dependent on the wavelength, so that conditions would get worse. However, it is known that the shorter the fiber is, the less the PMD becomes, [21]. In this sense, the length of the fiber may be reasonably shortened in order to produce a broadband wavelength converter. However, as in the case of the aforementioned longitudinal direction of the dispersion or the SBS threshold value, it has not discussed specifically as to what reference the length of the fiber should be decided.

By the foregoing discussion, it has been pointed out that, in order to allow the four-wave mixing to be generated with high.efficiency in an optical fiber, (I) a length of a fiber is required to be long enough to cause the nonlinear interaction, and (II) a somewhat short fiber has to be used in accordance with the bandwidth where the four-wave mixing is allowed to be generated, in order to reduce the effect of PMD. In consideration of this discussion, this application will provide an answer to the questions of how to shorten the length of the fiber with a given power of the pumping light and how long the fiber should be in order to generate efficient four-wave mixing.

As the means for solving the problems, it was considered that not an approximate solution but a precise analysis had to be carried out. The differential equations for describing TWM are represented by the following nonlinear simultaneous ordinary differential equations under the steady state (in the case of the continuous light as a limit) [9, 24].

$$(dE_p/dz)+(\tfrac{1}{2})\alpha E_p = i\gamma[(|E_p|^2+2|E_s|^2+2|E_c|^2)E_p+2E^*_p E_s E_c \exp(i\Delta\beta z)] \quad (2.\,a)$$

$$(dE_s/dz)+(\tfrac{1}{2})\alpha E_s = i\gamma[(|E_s|^2+2|E_c|^2+2|E_p|^2)E_s+E^*_c E_p^2 \exp(-i\Delta\beta z)] \quad (2.\,b)$$

$$(dE_c/dz)+(\tfrac{1}{2})\alpha E_c = i\gamma[(|E_c|^2+2|E_p|^2+2|E_s|^2)E_c+E^*_s E_p^2 \exp(-i\Delta\beta z)] \quad (2.\,c)$$

where E denotes an electric field, and subscripts p, s, and c denote the pumping light, the signal light (the probe light), and wavelength converted light (idler light); $\alpha$ denotes loss of the optical fiber per unit distance; and $\gamma$ denotes a nonlinear coefficient. $\gamma$ is expressed as follows using a pumping light wavelength $\gamma p$, a non-linear refractive index n2, and an effective area Aeff.

$$\gamma = (2\pi/\lambda_p) \cdot (n_2/Aeff) \quad (3)$$

In addition, in equations (2.a), (2.b) and (2.c), $\Delta\beta$ is phase mismatch of a propagation constant and the phase matching condition is satisfied in terms of frequency given by $$2\omega_p = \omega_s + \omega_c \quad (4),$$

where $\omega$ is an angular frequency of light, having a relationship of $\omega = 2\pi f$ with frequency f. At this time, $\Delta\beta$ is given by $$\Delta\beta(\omega_s) = -(\lambda_p^2/2\pi c) D(\lambda_p) (\omega_s - \omega_p)^2 \quad (5),$$

where D is a chromatic dispersion coefficient of the optical fiber, the quantity being normally expressed in ps/nm/km unit, and c is the speed of light in vacuum. Equation (4) means that, in the case where the point of pumping light is determined on the wavelength axis (or on the frequency axis), the frequency of the idler light that is obtained by setting the signal light having an angular frequency $\omega_s, \omega_1$ is determined uniquely. Equation (5) gives phase mismatch of the propagation constant under these conditions. The bandwidth of a wavelength converter can be determined from the fact that degradation in conversion efficiency caused by a phase mismatch $\Delta\beta$ is calculated.

It is shown that equation (2.a), (2.b), and (2.c) can be used for describing the optical phenomena not only of continuous light but also somewhat pulsed light [1–3]. Since equation (2.a), (2.b), and (2.c) are ordinary differential equations, numerical integration can be made by using a method such as the Runge-Kutta method under appropriate initial conditions. Since the differential equations are for electric fields, it is generally necessary to give the intensity and phase of light as the initial conditions. However, the aforementioned discussion does not hold true on the system where the amplitude of the converted light (idler light) is initially zero. In the case of wavelength conversion, the effect of the initial phase can be ignored [23] because initial idler power is zero. Otherwise, a nonlinear device employing the FPM would be very unstable and difficult to operate. Therefore, the calculation can be carried out by giving the intensity of the pumping light and the intensity of the signal light (probe light) as the initial conditions. At this time, each initial phase may be made zero. In this way, a numerical calculation is carried out with accuracy of an error of the order of $10^{-8}$ to go on with the discussion. The error was determined by evaluating the two conserved quantities obtained from equation (2.a), (2.b), and (2.c).

When the equations (2.a), (2.b), and (2.c) are solved under appropriate conditions, the following discussion is carried out using the conversion efficiency of the idler light. As for aforemention edequation (2.a), (2.b), and (2.c), two different approximate solutions are known under appropriate conditions. In this application, for the sake of convenience, after the initial of the inventors, the solutions are referred to as SB solution (Stolen and Bjorkholm) [8] and HJKM solution (Hill, Johnson, Kawasaki, and MacDonald) [24]. Idler light conversion efficiency Gc is given by a ratio of idler light intensity Pc(L) measured at the output end of the fiber to probe light intensity Ps (0) at the input end of the fiber. Moreover, probe light gains Gs is given by a ratio of probe light intensity Ps(L) measured at the output end of the fiber to probe light intensity Ps(0) at the input end of the fiber. The Ps and Pc are the probe light intensity and the idler light intensity, respectively, which are expressed with functions having an argument of distance from the input end of the fiber. L represents length of the fiber. With only results being shown, signal light gain Gs and idler light conversion efficiency Gc, which are obtained by respective approximate solutions, are expressed as follows.

(a) SB solution;

(a-1) for $4\gamma P_p > -\Delta\beta$, $$Gs = 1 + \gamma^2 P_p^2(0) L^2 [(\sin h \, (g_a L)/g_a L]^2 \quad (6.1.1.a)$$

$$Gc = \gamma^2 P_p^2(0) L^2 [(\sin h \, (g_a L)/g_a L]^2 \quad (6.1.1.b),$$

where $$g_a = (\tfrac{1}{2})[-\Delta\beta(\Delta\beta + 4\gamma P_p)]^{1/2} \quad (6.1.2),$$

Next, (a-2) for $4\gamma P_p > -\Delta\beta$, $$Gs = 1 + \gamma^2 P_p^2(0) L^2 [(\sin (g_b L)/g_b L]^2 \quad (6.2.1.a)$$

$$Gc = \gamma^2 P_p^2(0) L^2 [(\sin (g_b L)/g_b L]^2 \quad (6.2.1.b),$$

where $$g_b = (\tfrac{1}{2})[\Delta\beta(\Delta\beta + 4\gamma P_p)]^{1/2} \quad (6.2.2).$$

(b) HJKM solution;

$$G_s = P_s(L)/P_s(0) = \exp(-\alpha L) \quad (7.1)$$

$$G_c = P_c(L)/P_s(0) = \gamma^2 P_p^2(0) e^{-\alpha L} \{(1 - e^{-\alpha L})^2 + e^{-\alpha L} \sin^2(\Delta\beta L/2)\}/(\alpha^2 + \Delta\beta^2) \quad (7.2).$$

These solutions are frequently used in the design or analysis of devices employing FPM [2, 3, 6]. Action Here, using equation (2.a) to equation (7.2) for which discussions were made in (a), a method for determining the optimum length of a fiber is shown specifically. As already reported, the discussion based on the analysis of Stolen and Bjorkholm [1–3] includes three cases, that is, (A) the case where a pumping light wavelength is set at an anomalous dispersion region of a fiber and the pumping light having intensity not less than the threshold value given by equation (1) is launched; (B) the case where a pumping light wavelength is set at an anomalous dispersion region of the fiber and the pumping light having an intensity less than the threshold value given by equation (1) is launched; and (C) the case where the pumping light wavelength is created in a normal dispersion region of the fiber.

FIGS. 4–9 show, with three typical cases, the comparison between the foregoing approximate solutions and the solutions solved by direct numerical integration of equation (2.a)–(2.c).

(A) FIG. 4 shows the case where the intensity of the pumping light is greater than the threshold value given by equation (1) in the anomalous dispersion region.

FIG. 4 shows the calculated result of the probe light gain, while FIG. 5 shows the calculated result of the idler light.

As can be seen from each of these figures, in the case where the length of the fiber is short, all solutions are consistent, however, the three solutions give different results when the length of the fiber becomes longer. As shown in FIG. 5, of the two approximate solutions, regarding the one solution that gives less difference over a longer length of the fiber when compared with the numerical solution, a distance at which an error of 0.1 dB is raised between the solution and the numerical solution is put to Lmin. In addition, in FIG. 5, the value of the shortest distance of the distances at which the numerical values take on maximal values is to be put to Lmax. Since similar definitions can be made using FIG. 4, of the probe light gain and conversion efficiency, the Lmin and Lmax may be read from the plot that is used for producing an actual device. For example, to produce OPA, the Lmin and Lmax may be determined from the plot of the probe light gain. On the other hand, to produce an optical wavelength converter, the Lmin and Lmax may be determined from the plot of the idler light conversion efficiency. Incidentally, when the Lmax is determined, it can be set (determined) to a length (distance) 10% longer than the shortest distance of the distances at which the numerical solutions take on maximal values. It is better to take, as the optimum value of Lmax, the shortest distance value of the distances at which the numerical solutions take on maximal values. However, since a distance 10% longer than the shortest distance is allowed to ensure the quality of four-wave mixing in practice, it is possible to determine the distance that is 10% longer than the shortest distance as the value of the Lmax.

Such characteristic length parameters, Lmin and Lmax, can be defined in the remaining two cases. This is shown in FIGS. 6, 7, 8, and 9.

(B) FIGS. 6 and 7 show the case where the intensity of the pumping light is less than the threshold value given by equation (1) in the anomalous dispersion region.

FIGS. 6 and 7 show the calculated results in the case where the intensity of the pumping light is less than the threshold value given by equation (1) in the anomalous dispersion region.

FIG. 6 shows the calculated results of the probe light gain, while FIG. 7 shows the calculated result of the idler light conversion efficiency.

As can be seen from FIGS. 6 and 7, in this case, the SB solution oscillates. However, in this case, the SB solution does not include the effect of loss [8, 9] and thus produces a shift between the numerical solution. Thus, the Lmax and Lmin can be determined from the numerical solution like the case (A).

(C) FIGS. 8 and 9 show the case of normal dispersion region.

FIGS. 8 and 9 shows the typical calculated result in the normal dispersion region. As can be seen from FIGS. 8 and 9, the Lmax and Lmin can also be determined from the numerical solution in this case.

FIG. 8 shows the calculated results of the probe light gain, while FIG. 9 shows the calculated result of the idler light conversion efficiency.

As can be seen from the foregoing discussion, in all conceivable cases, the Lmax and Lmin can be determined by comparing the numerical solution with the SB solution or the HJKM solution. By following this procedure, it can be found that the length of the fiber to be used for a fiberoptic nonlinear device employing FPM should be set within the range of Lmin≦L≦Lmax. Although there is a length even in the range L≧Lmax is enough to obtain the same probe light gain or idler light conversion efficiency, a fiber shorter in length would be able to better prevent the stimulated Brillouin scattering, the polarization mode dispersion, and the variation in dispersion in the longitudinal direction. Therefore, it is essential to adopt the condition L≦Lmax.

In addition, it is not always true that the SB solution and the HJKM solution are a good approximation. As can be seen from equation (6.1.1.a) to (6.1.2), from equation (6.2.1.a) to (6.2.2), and from equation (7.1) to (7.2), these solutions are characterized in that the probe light gain and the idler light conversion efficiency do not depend on the intensity of the probe light. In order to verify this fact in practice, the intensity of the pumping light intensity was fixed to 20 dBm (100 mW) with the same parameters as those of the system shown in FIGS. 4 and 5 to carry out calculation by varying the input intensity of the probe light. The results are shown in FIGS. 10 and 11. FIGS. 10 and 11 show the probe light gain and the idler light, conversion efficiency in the case where the intensity of each probe light is varied in a discrete manner. The horizontal axis represents the length of fiber, which is normalized with the non-linear length defined by LNL≡1/[γ Pp (0)].

FIG. 10 shows the probe light gain calculated by varying the intensity of the probe light. (The intensity of the pumping light is fixed to 20.0 dBm.)

FIG. 11 shows the idler light conversion efficiency calculated by varying the input intensity of the probe light. (The intensity of the pumping light is fixed to 20.0 dBm.)

As can be seen from this figure, in general, the probe light gain and the idler light conversion efficiency depend on the input intensity of the probe light. However, it can be found that decreasing the input probe intensity causes them to approach a certain curve. It is thought that the property of the SB solution and the HJKM solution holds true at this limit, the property being that "the probe light gain and the idler light conversion efficiency do not depend on the input probe light intensity". Therefore, the discussion based on the SB solution and the HJKM solution could not be always applied to a general case. Thus, the optimum length of a fiber can be known only by solving equation (2.a)–(2.c) under actual conditions.

The foregoing discussions were made only on the wavelength dispersion, the pumping light intensity, and the generation efficiency of FPM, without considering the state of polarization.

Next, a broadband OPA and a broadband wavelength converter, as discussed in literatures [4–7, 10, 11], are considered. In these cases, it is also naturally necessary to determine the length of a fiber in consideration of the generation efficiency of FPM as discussed so far. However, it is additionally necessary to consider this from the viewpoint of the effect of PMD as mentioned above. From the analysis of DSF [21, 22], it can be found that the shorter the length of the fiber, the broader the bandwidth, in which the first order approximation [19] suggested by Poole and Wagner holds true, becomes. This bandwidth is sometimes called the bandwidth of PSPs [21, 22]. According to the theory by Poole and Wagner [19], it teaches that the principal state of polarization is preserved under any wavelength within the bandwidth of the principal state of polarization, irrespective of the dependency of birefringence on wavelength. Accordingly, PMD can be defined as the time of the group delay difference.

It is necessary to reduce the effect of PMD as much as possible when a broadband wavelength conversion or a broadband OPA is prepared using a highly nonlinear optical fiber, which is not of a polarization maintaining type. Therefore, it is thought that the effect of FPM due to PMD can be reduced by shortening the length of the fiber so as to make the conversion band width smaller than the band width of the principal state of polarization. In this case, the pumping light and the signal light are inputted in the same state of polarization with the state of the polarization being one of the principal states of polarization, thereby minimizing the degradation of the FPM efficiency due to different polarization.

Suppose that the fiber is long and the bandwidth of conversion is greater than that of the principal state of polarization. In this case, even if the pumping light and the signal light are inputted in the same state of polarization, higher-order PMD or a depolarized effect would appear [25]. Accordingly, the shift between the pumping light and the state of polarization (of the signal light apart farthermost from the pumping light) at the extreme edge of the bandwidth becomes greater.

In fact, by following the procedures shown in literature [22], the bandwidth of the principal state of polarization can be experimentally determined. By using this result, it is possible to specify the length of the fiber from the standpoint of making the bandwidth of conversion narrower than that of the principal state of polarization. The optimization of the length of a fiber can be proceeded further by discussing the foregoing conversion efficiency of FPM on condition that an optical fiber which is shorter than the length of fiber limited by PMD is used. Moreover, information for reviewing the intensity of the pumping light would be obtained.

According to the present invention, the four-wave mixing can be generated with sufficient efficiency when a fiberoptic device employing the four-wave mixing, which is a nonlinear effect in a optical fiber, especially such as a wavelength converter or an optical parametric amplifier as well as other fiberoptic devices employing the four-wave mixing. By using a short highly nonlinear optical fiber that satisfies the conditions evaluated here, it becomes possible to generate the four-wave mixing in a manner that makes the most of the feature of the pumping light by minimizing the stimulated Brillouin scattering, the mismatching the states of polarization between the pumping light and signal light due to the birefringence of the fiber, and the effect of fluctuation in wavelength dispersion in the longitudinal direction causing from actual manufacturing process of the optical fiber.

BRIEF DESCRIPTION OF THE DRAWINGS

These and other advantage of the present invention will be apparent and more readily appreciated from the following detailed description of the exemplary embodiments of the invention taken in conjunction with the accompanying drawings, in which.

DETAILED DESCRIPTION OF THE PREFERRED EMBODIMENTS

Now, the present invention will be specifically explained with reference to each of the embodiments below.

Embodiment 1

Figure 1:
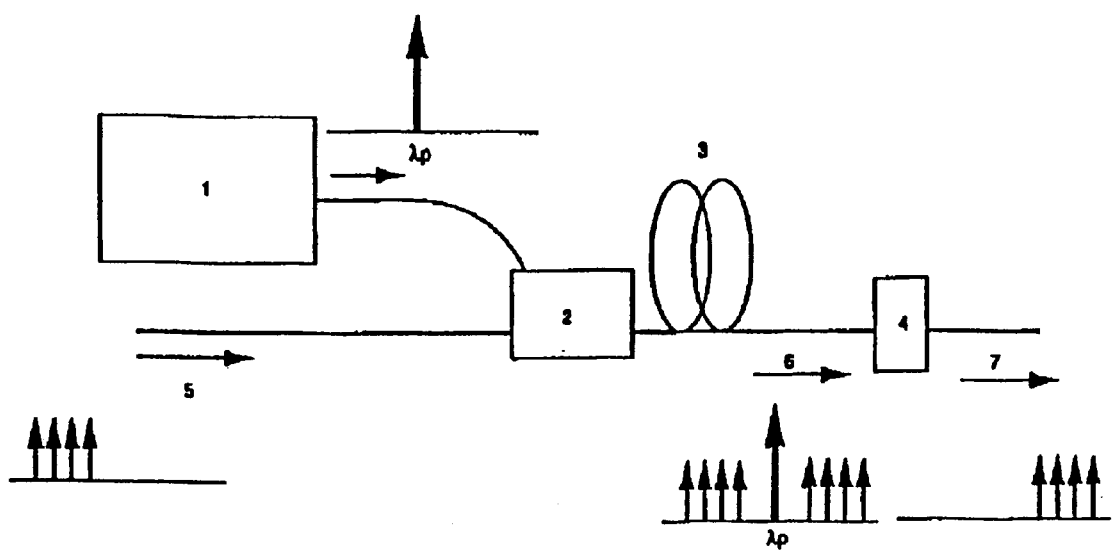
FIG. 1 is a conceptual explanatory view showing an embodiment of a wavelenght converter according to the present invention.

Embodiment 1 shows a form of a wavelength converter for implementing the present invention. FIG. 1 is a conceptual view showing a conceivable wavelength converter. Pumping light launched into a highly nonlinear optical fiber 3 from a pumping light source 1 is combined with a light signal 5 by an optical combiner 2. This combined light generates idler light in a highly nonlinear optical fiber 3 of which length is optimized. The wavelength of the signal light is converted by the FPM interaction into this idler light. Light 6 on the frequency axis of which all of the signal light, the pumping light, and the idler light are present is emitted from the output end of an optical fiber 3. Accordingly, a wavelength converter can be implemented by filtering the light 6 to obtain only the idler light 7 using an optical filter 4. Incidentally, the idler light 7 and the light signal 5 are phase conjugated, and thus this device serves also as a generator of an optical phase, conjugation beam of light.

Embodiment 2

Figure 2:
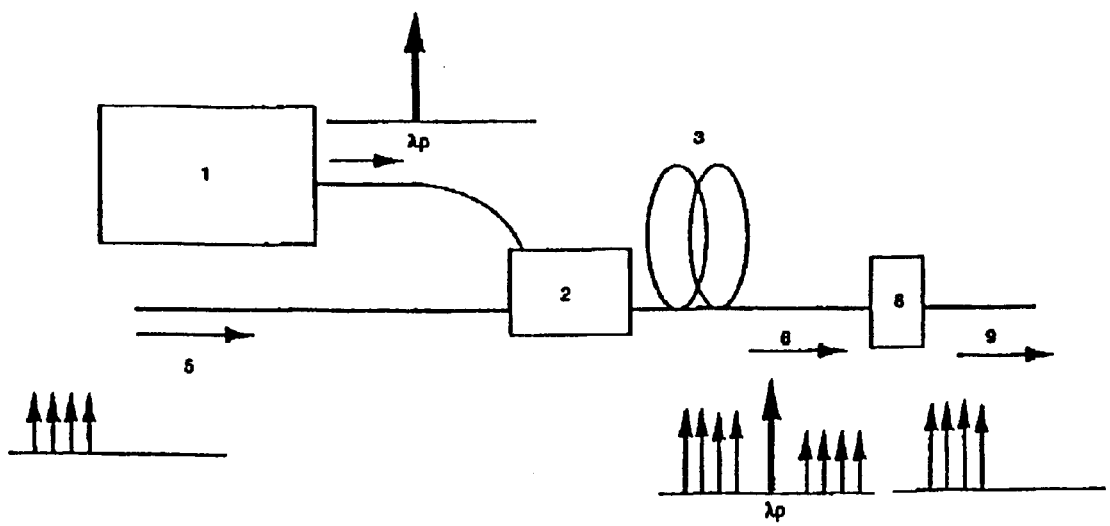
FIG. 2 is a conceptual explanatory view showing another embodiment of an optical parametric amplifier according to the present invention.

Embodiment 2 shows a form of an optical parametric amplifier for implementing the present invention. FIG. 2 is a conceptual view showing a conceivable optical parametric amplifier. Pumping light launched from a pumping light source 1 is combined with a light signal 5 by an optical combiner 2. This combined light generates idler light in a highly nonlinear optical fiber 3 of which length is optimized, while the intensity of the signal light itself is being amplified by the parametric amplification effect. Light 6 on the frequency axis of which all of the amplified signal light, the pumping light, and the idler light are present is emitted from the output end of the optical fiber 3. Accordingly, an optical parametric amplifier can be implemented by filtering the light 6 to obtain only the amplified signal light 9 using an optical filter 8.

Embodiment 3

Embodiment 3 shows a form of an optical circuit to be used in an optical signal regeneration circuit for implementing the present invention. As described in literature [12], the optical regeneration circuit outputs an optical signal of which waveform is shaped with respect to an input signal light or extracts optical time division multiplexed signals. The optical circuit that constitutes the optical signal regeneration circuit shown in FIG. 2 of the literature [12] comprises, as shown in the specification of the literature [12], a highly nonlinear medium for generating four wave mixing, an optical filter for allowing only the idler light to pass therethrough, and a pumping light source. Therefore, the construction is the same as that of Embodiment 1. In the literature [12], a semiconductor amplifier was used as the highly nonlinear medium. By constituting the optical signal regeneration circuit shown in the literature [12] using the optical circuit of the configuration of FIG. 1, a fiber optical signal regeneration circuit can be implemented.

Embodiment 4

Figure 3:
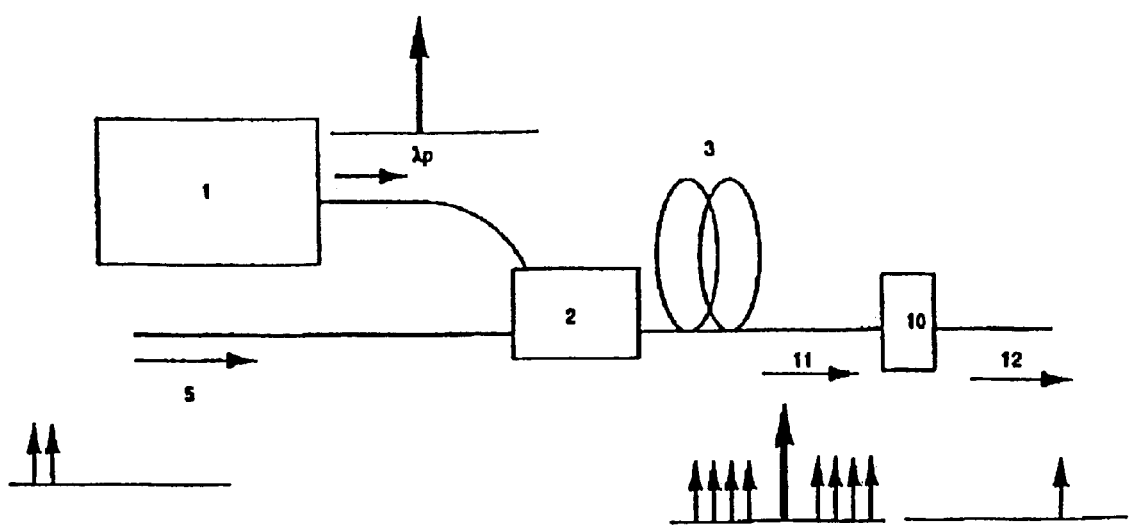
FIG. 3 is a conceptual explanatory view showing an embodiment of multi-wavelength light source according to the present invention.
Figure 4:
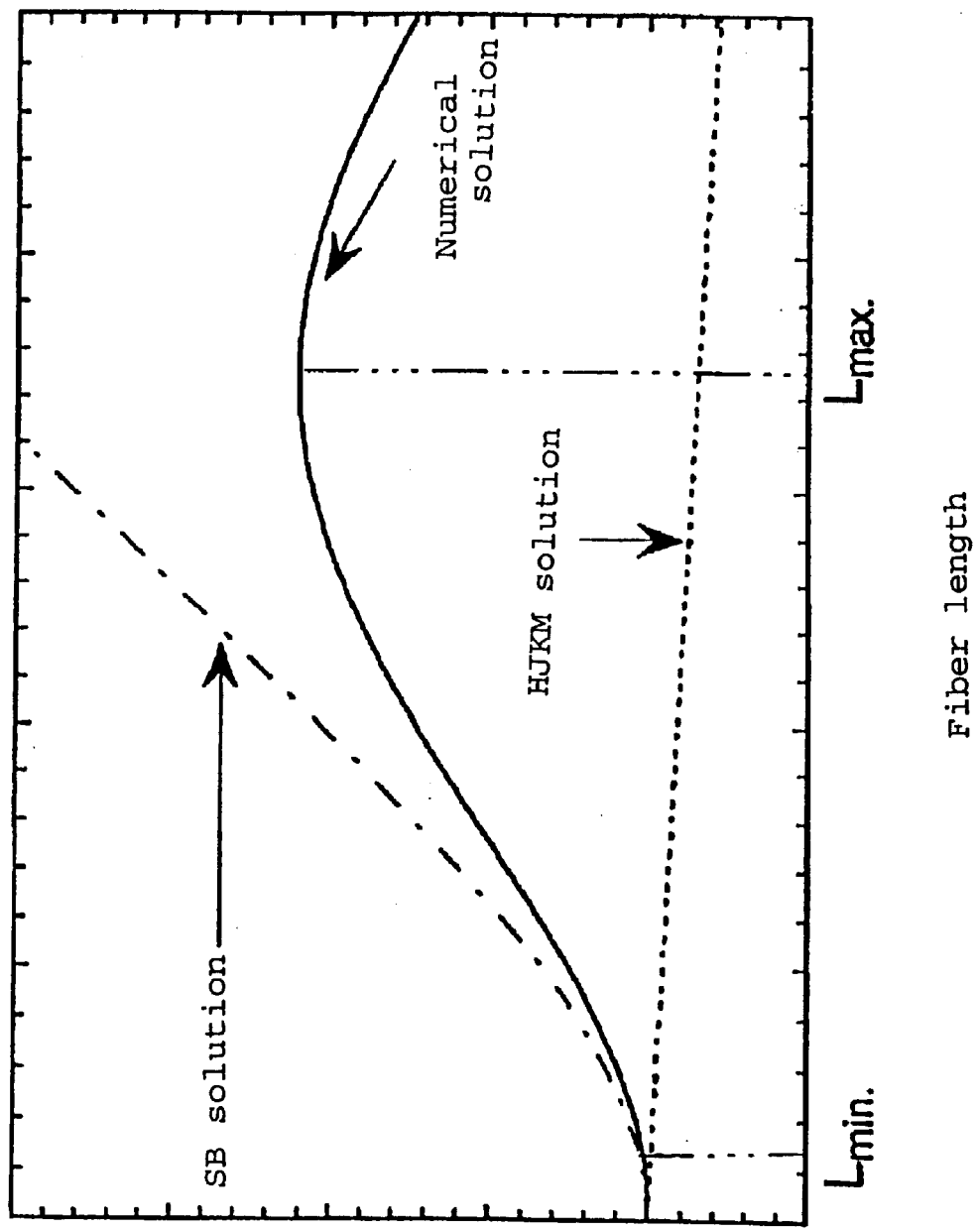
FIG. 4 is a view showing the characteristic plot of the gain of probe light against the length of an optical fiber in the case where the intensity of pumping light is greater than a predetermined value in an anomalous dispersion region.
Figure 5:
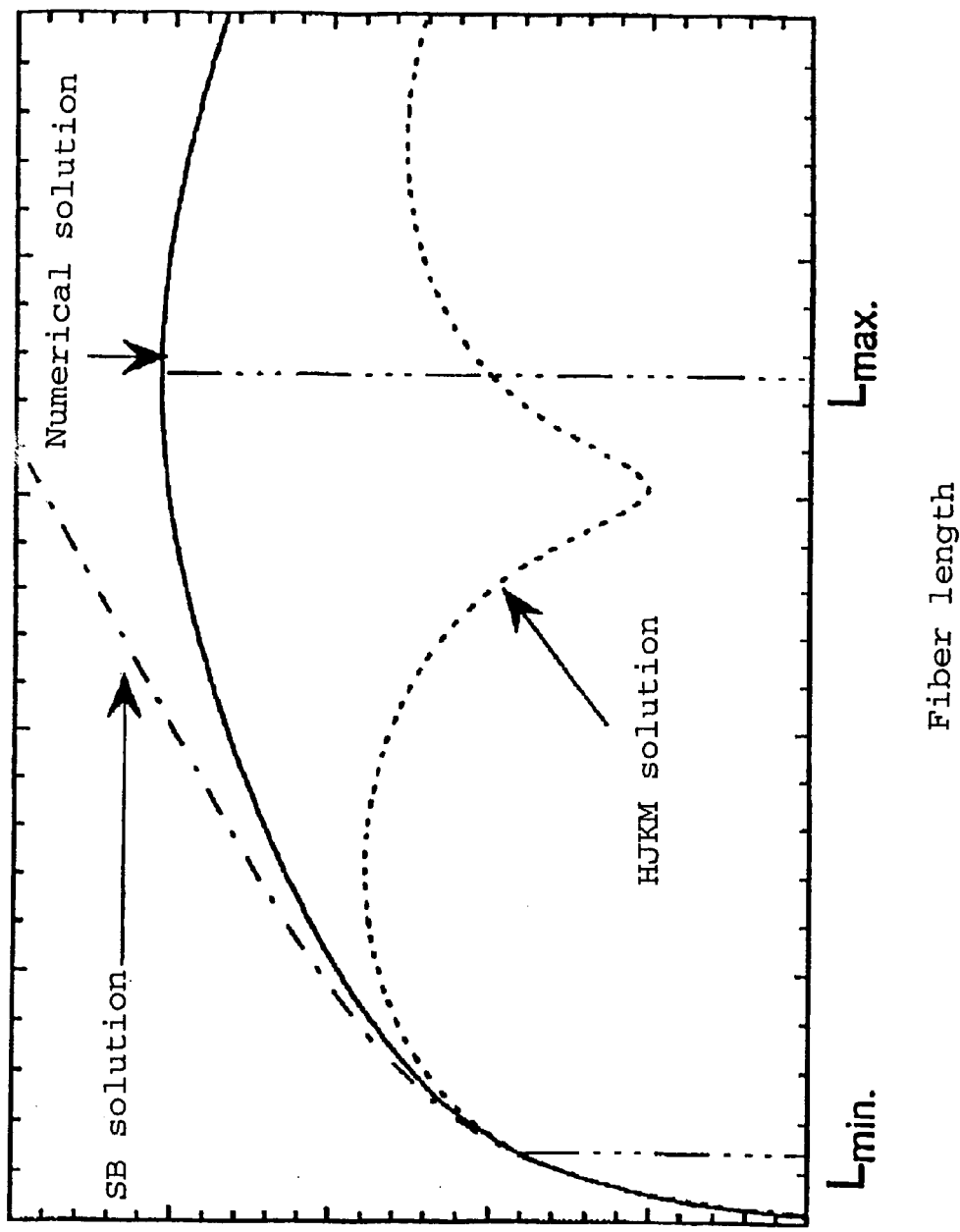
FIG. 5 is a view showing the characteristic plot of the conversion efficiency of idler light against the length of an optical fiber in the case where the intensity of pumping light is greater than a predetermined value in an anomalous dispersion region.
Figure 6:
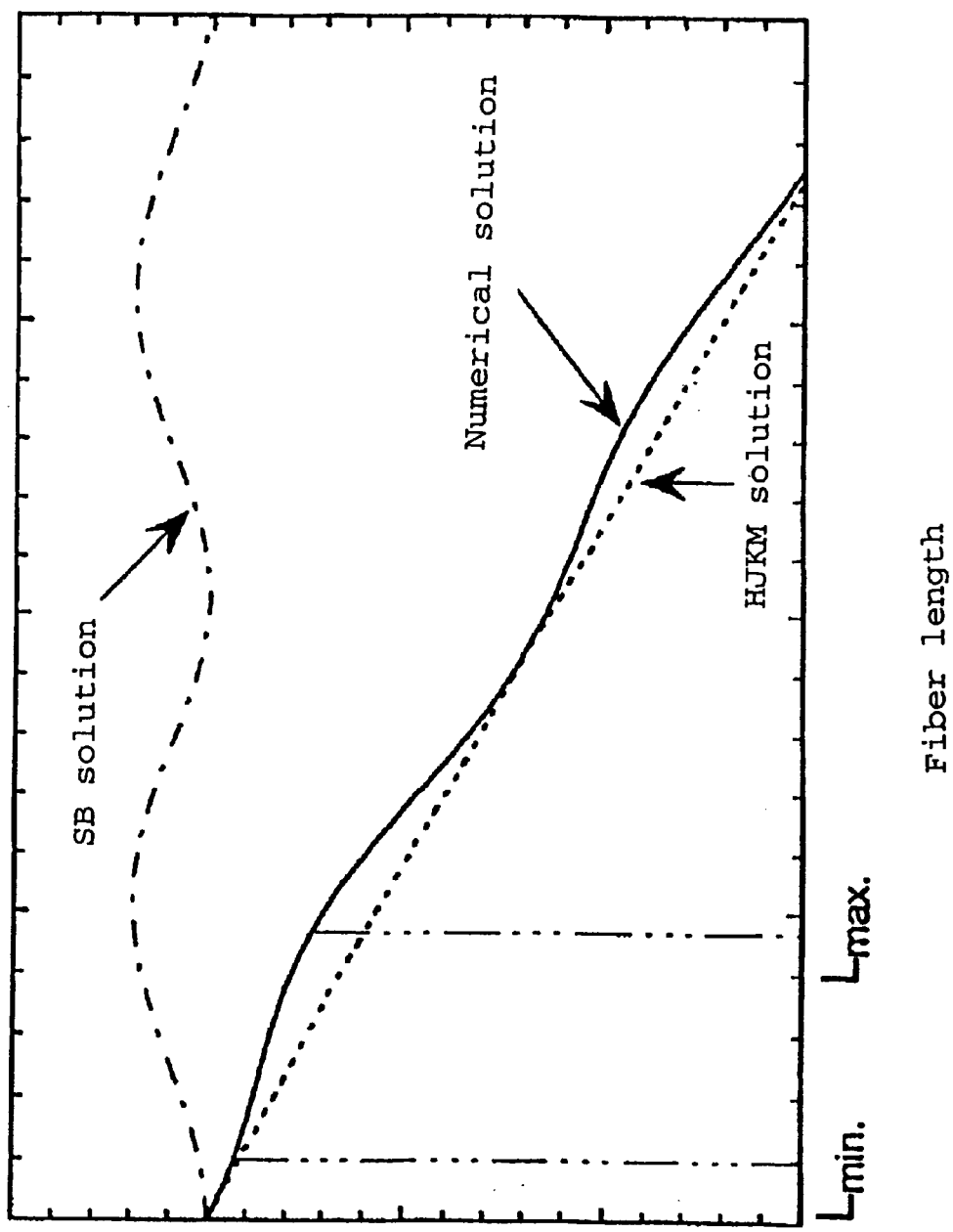
FIG. 6 is a view showing the characteristic plot of the gain of probe light against the length of an optical fiber in the case where the intensity of pumping light is less than a predetermined value in an anomalous dispersion region.
Figure 7:
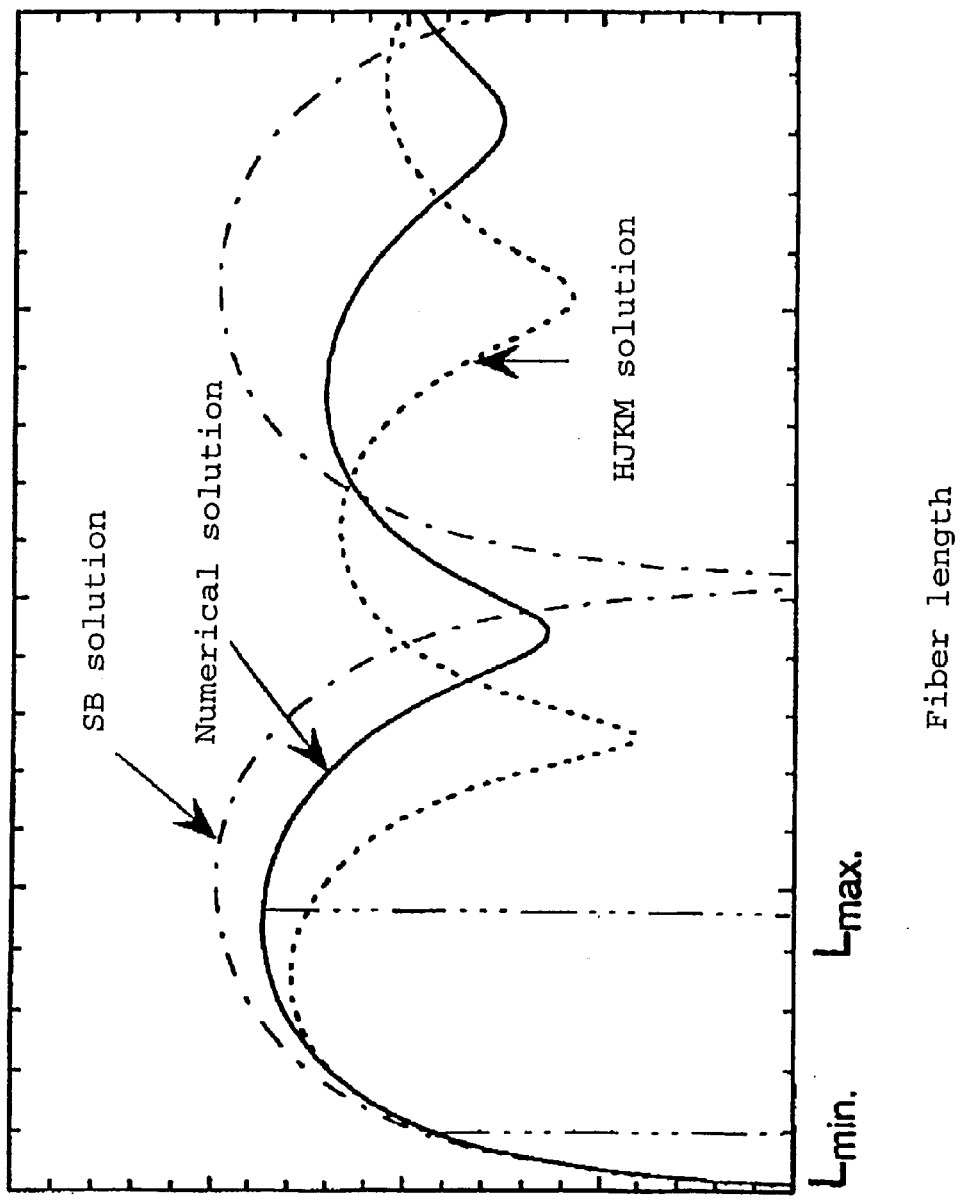
FIG. 7 is a view showing the characteristic plot of the conversion efficiency of idler light against the length of an optical fiber in the case where the intensity of pumping light is less than a predetermined value in an anomalous dispersion region.
Figure 8:
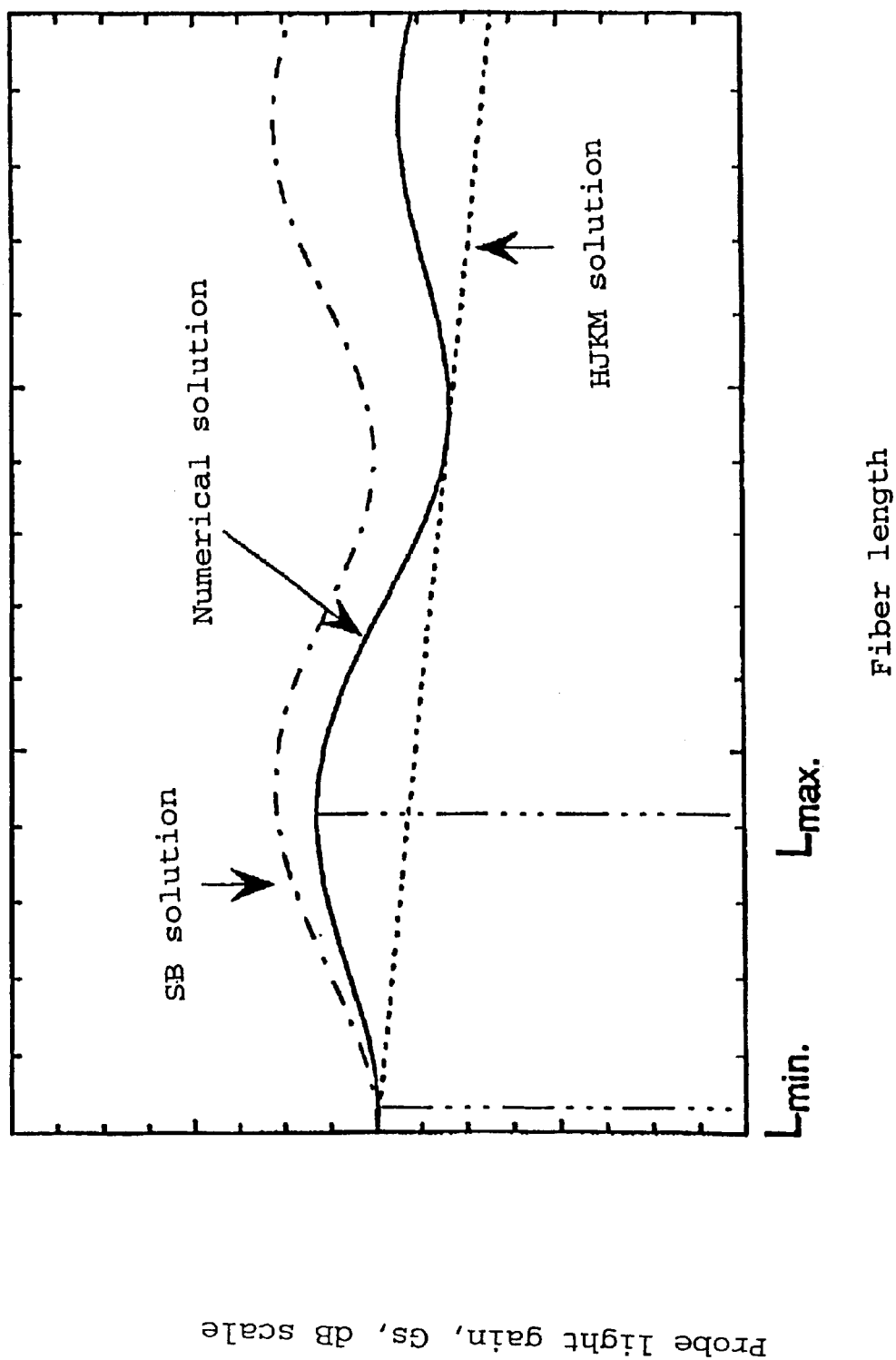
FIG. 8 is a view showing the characteristic plot of the gain of probe light against the length of an optical fiber in a normal dispersion region.
Figure 9:
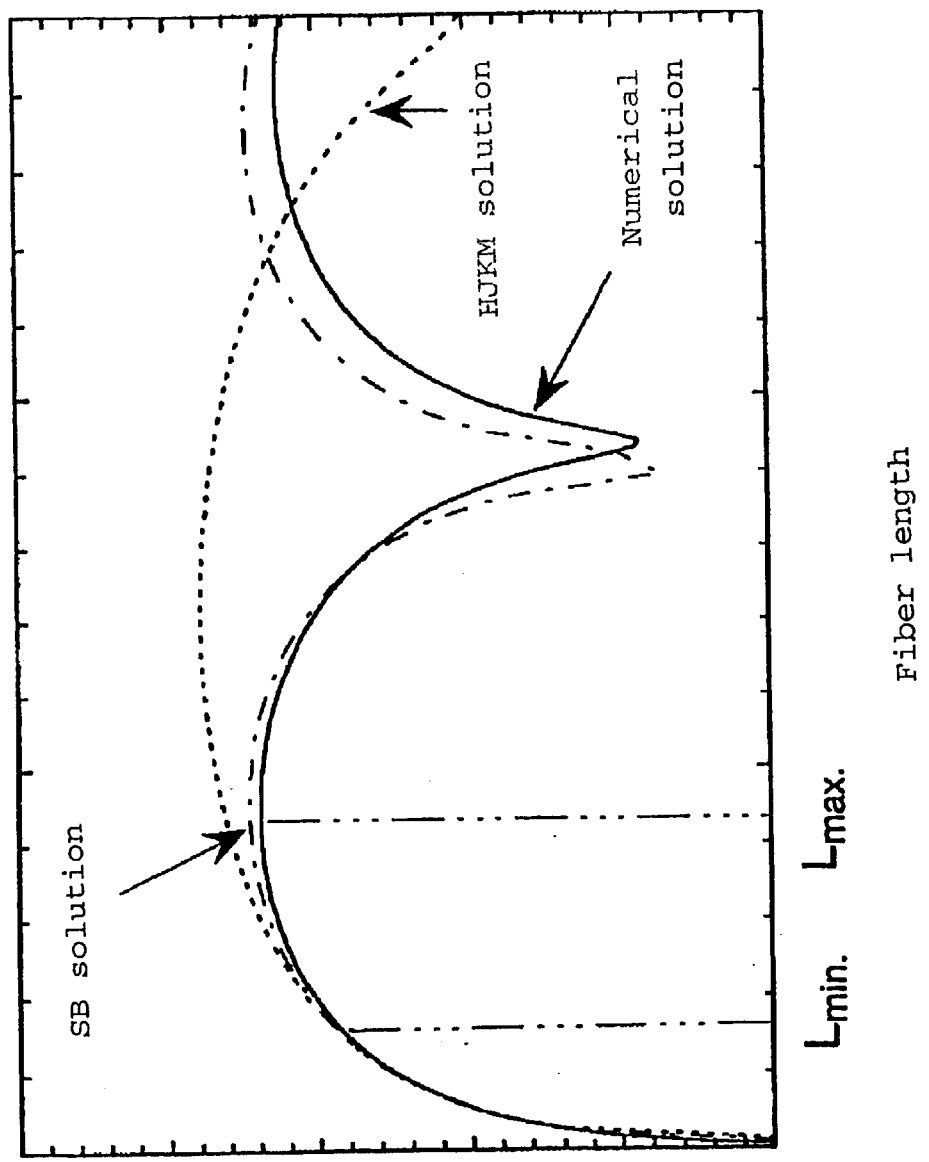
FIG. 9 is a view showing the characteristic plot of the conversion efficiency of idler light against the length of an optical fiber in a normal dispersion region.
Figure 10:
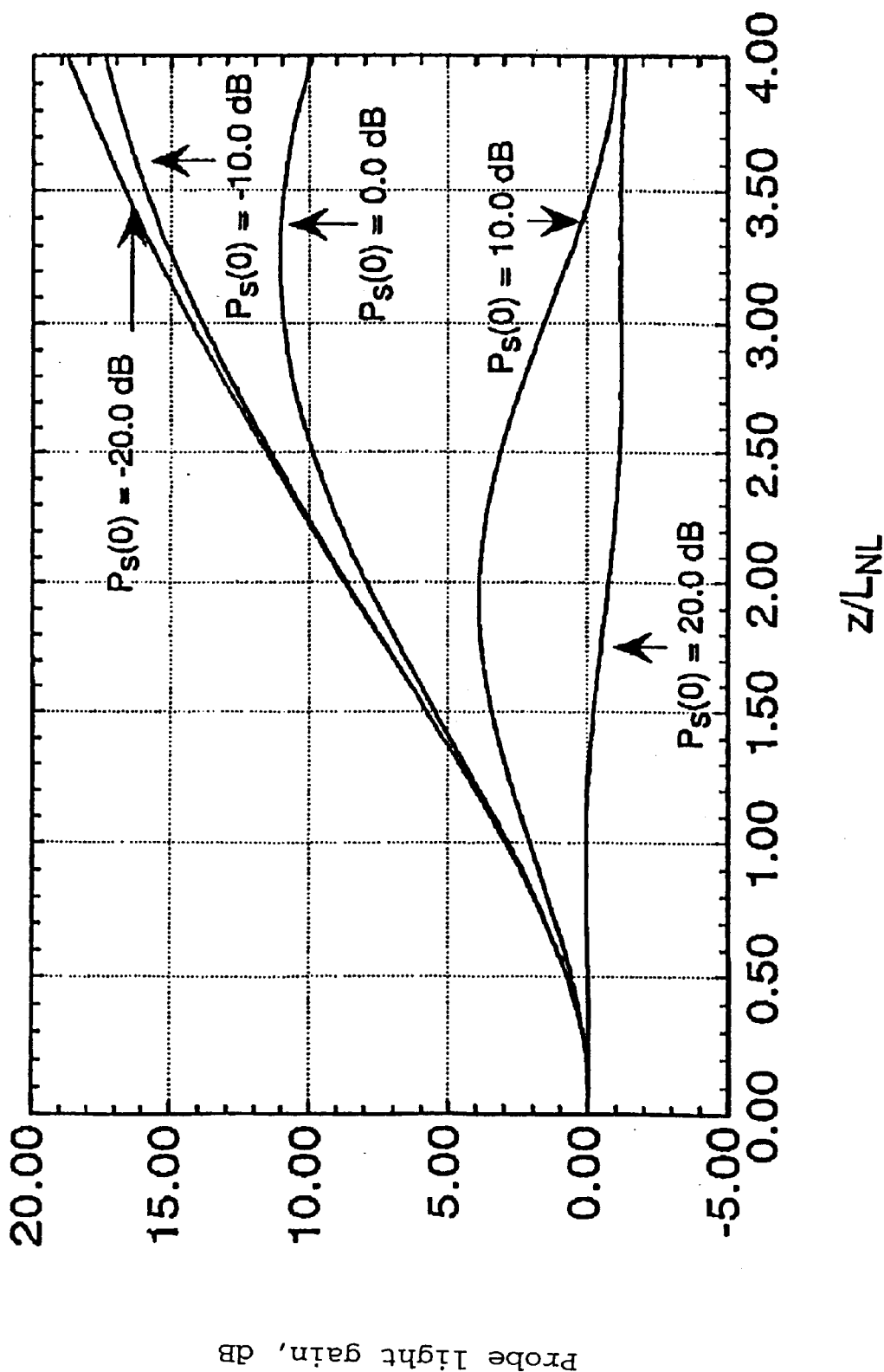
FIG. 10 is a view showing the characteristic plot of the gain of probe light against the normalized length of an optical fiber in the case where the intensity of the probe light is varied.
Figure 11:
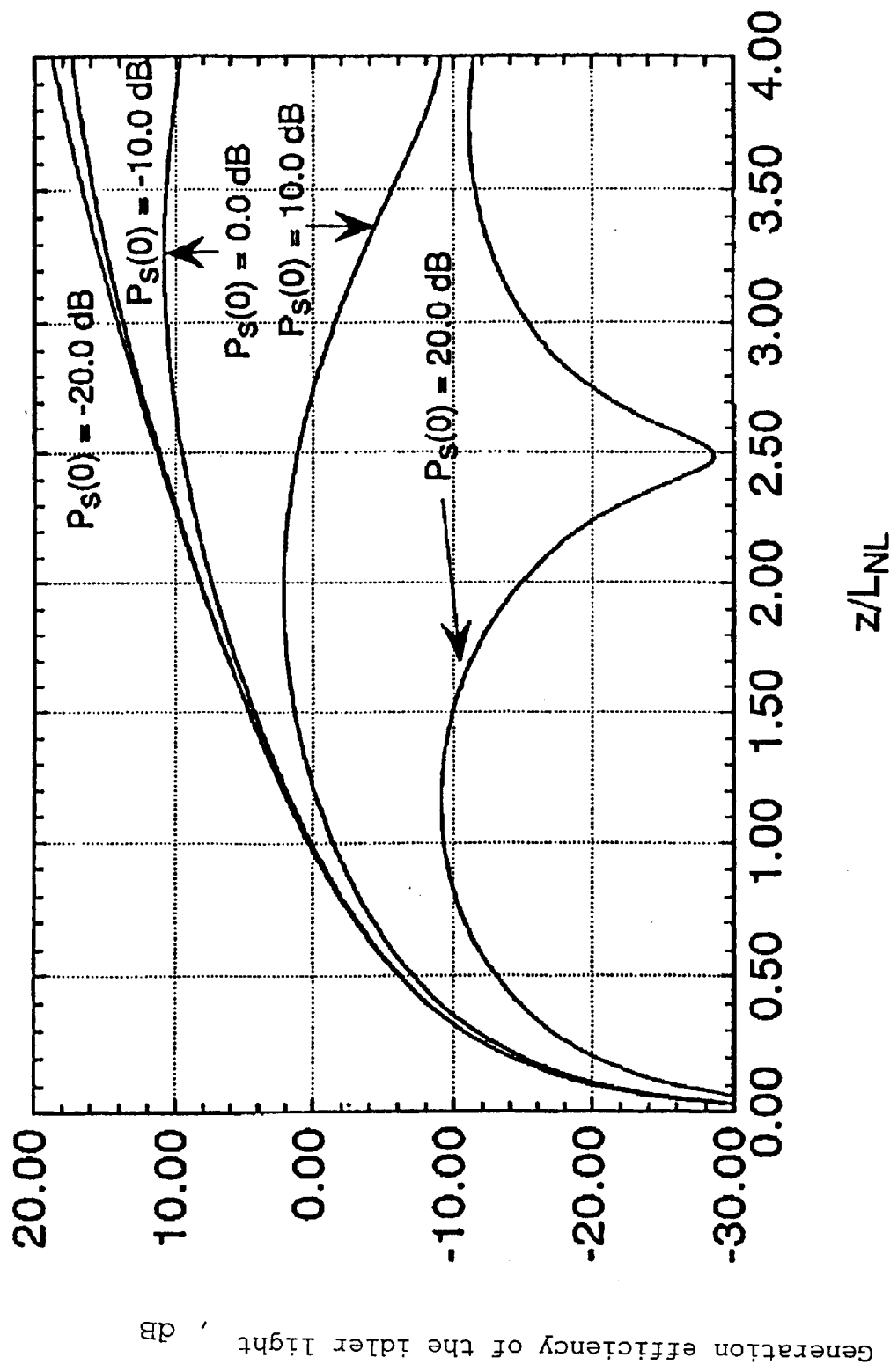
FIG. 11 is a view showing the characteristic plot of the conversion efficiency of idler light against the normalized length of an optical fiber in the case where the intensity of the probe light is varied.

Embodiment 4 shows a form of a multi-wavelength optical source for implementing the present invention. FIG. 3 is a conceptual view showing the multi-wavelength optical source. Pumping light launched from a pumping light source 1 is combined with ia light signal 5 by an optical multiplexer 2. This multiplexed light generates multiple idler light beams in a highly nonlinear optical fiber 3 of which length is optimized. Light 11 on the frequency axis of which all of the signal light, the pumping light, and a multiple of beams of idler light are present is emitted from the output end of an optical fiber. Accordingly, a multi-wavelength optical source can be implemented by filtering the light 11 to obtain only light 12 of desired wavelengths using a narrow-band optical filter 10.

Embodiment 5

In Embodiment 5, based on the results obtained through actual experiments, the implementation of a broadband wavelength converter with a half width of the half maximum of 20 nm is discussed. A wavelength conversion experiment is discussed in which the length of a fiber is changed. A broadband wavelength conversion was performed in the system as shown in Embodiment 1 using a highly nonlinear optical fiber.

Figure 12:
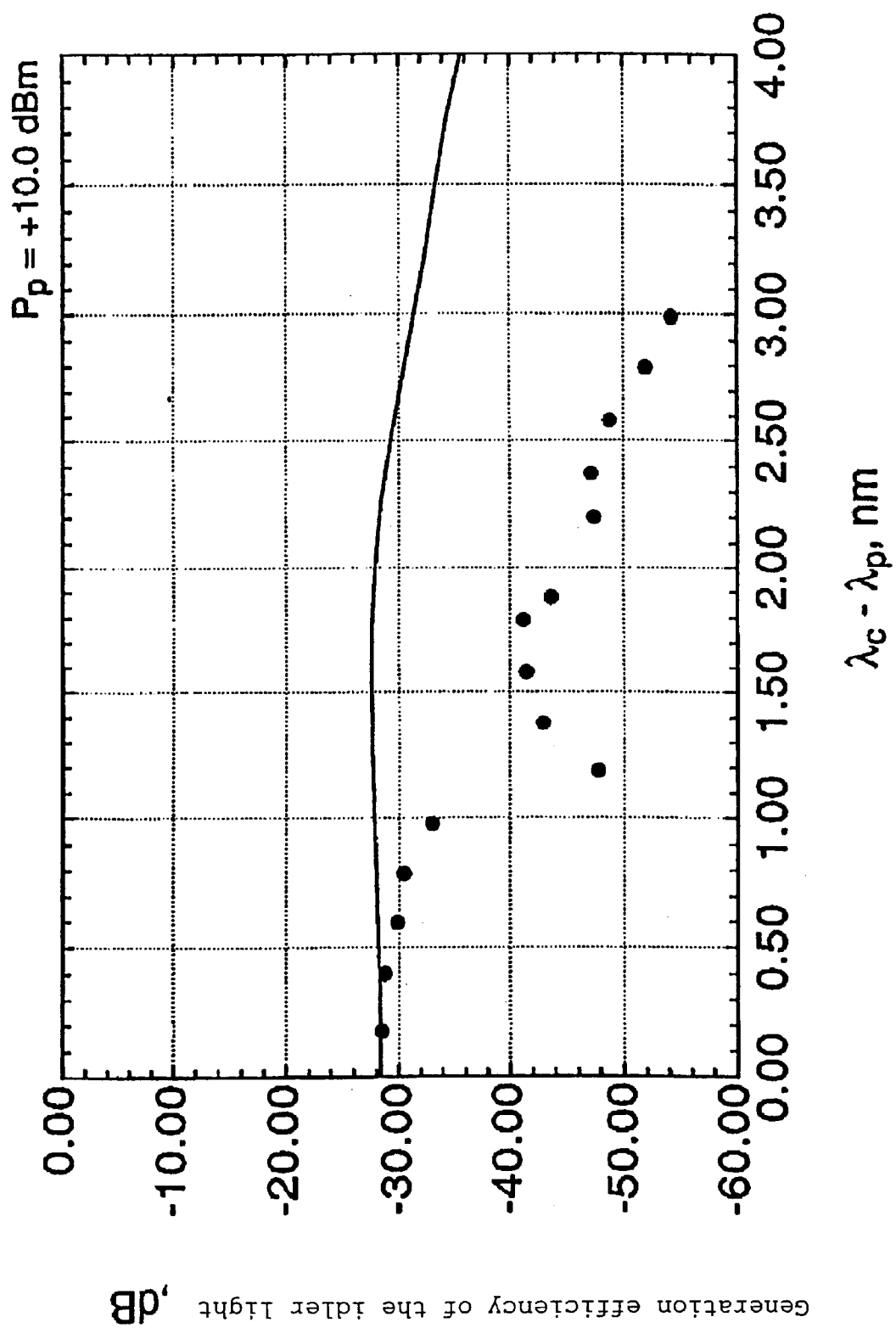
FIG. 12 is a view showing the characteristic plot of the conversion efficiency of idler light against the difference in wavelength between pumping light and idler light with an optical fiber of a different length.
Figure 13:
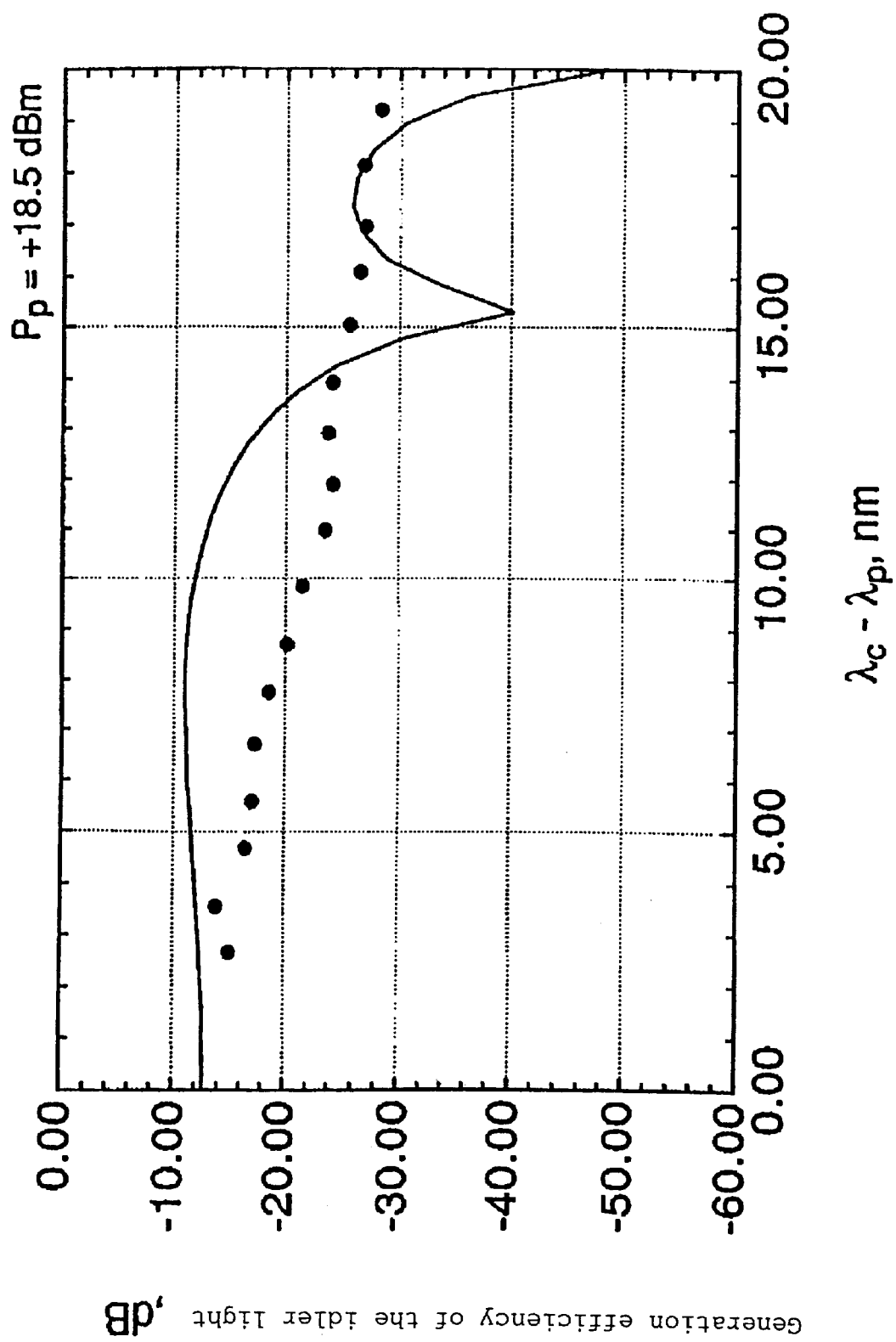
FIG. 13 is a view showing the characteristic plot of the conversion efficiency of idler light against the difference in wavelength between pumping light and idler light with an optical fiber of a different length.
Figure 14:
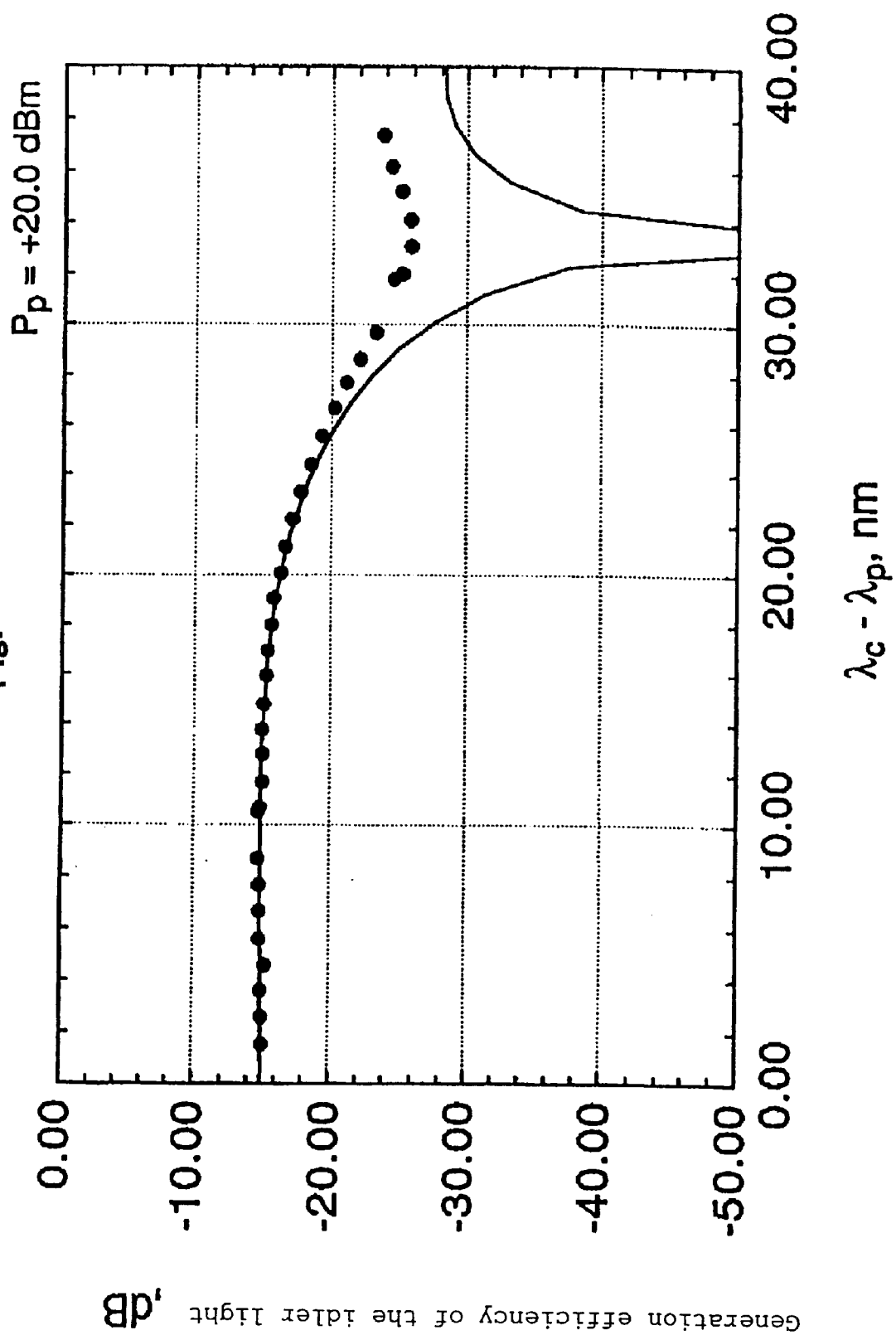
FIG. 14 is a view showing the characteristic plot of the conversion efficiency of idler light against the difference in wavelength between pumping light and idler light with an optical fiber of a different length.

FIGS. 12–14 show the results of the wavelength conversion experiment in which the length of a fiber was varied. The light source employed a continuous-wave light source. In each case, the pumping light input power is limited by SBS. Thus, this provided 10.0 dBm at 24.5 km, 18.5 dBm at 1.2 km, and 20.0 dBm at 0.2 km. As can be seen from the drawings, the shorter the lengths of the fiber, the greater the conversion efficiency and frequency bandwidth become. At the same time, the results of numerical calculation performed with corresponding parameters are shown with solid lines in FIGS. 12–14. The horizontal axis represents wavelength of the idler wavelength offset by the wavelength of the pumping light, while the vertical axis represents the conversion efficiency in the wavelength conversion. The calculation parameters were selected along the experiments. In addition, all losses other than those unique to the fiber such as splicing loss, which were generated in the actual system, were eliminated at the time of calculation. What is not notable in FIGS. 12–14 is that the results of the numerical calculation do not agree with the experimental results at distances 24.5 km and 1.2 km. Various reasons are conceivable for this fact. Among them, a variation in wavelength dispersion in the longitudinal direction can be thought to be the most probable reason. The results of the calculation gradually come closer to the experimental results as the fiber becomes shorter in length to cause the dispersion to become less.

Figure 15:
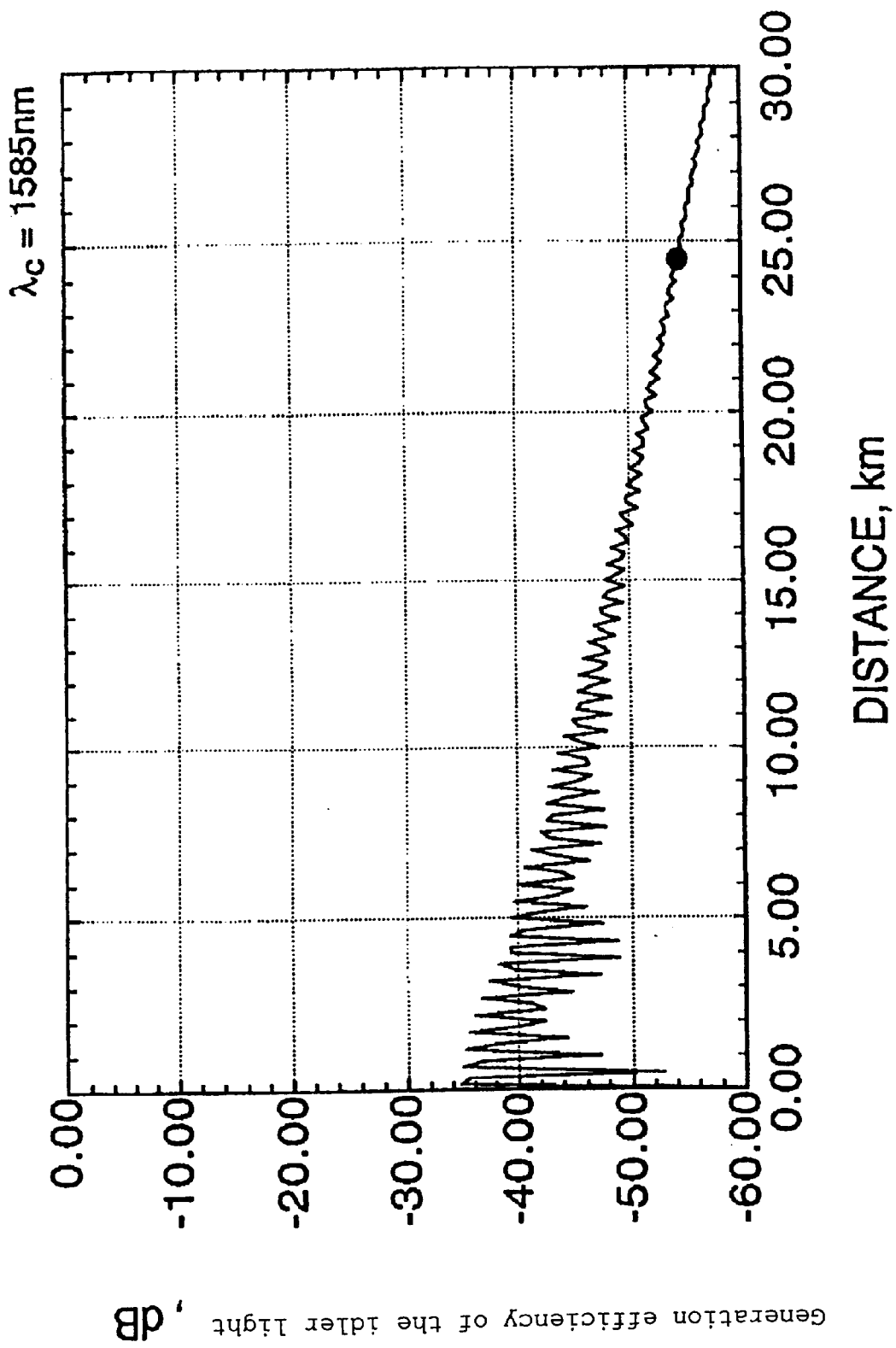
FIG. 15 is a view showing the characteristic plot of the conversion efficiency of idler light against the distance of an optical fiber in the longitudinal direction thereof with the optical fiber of a different length.
Figure 16:
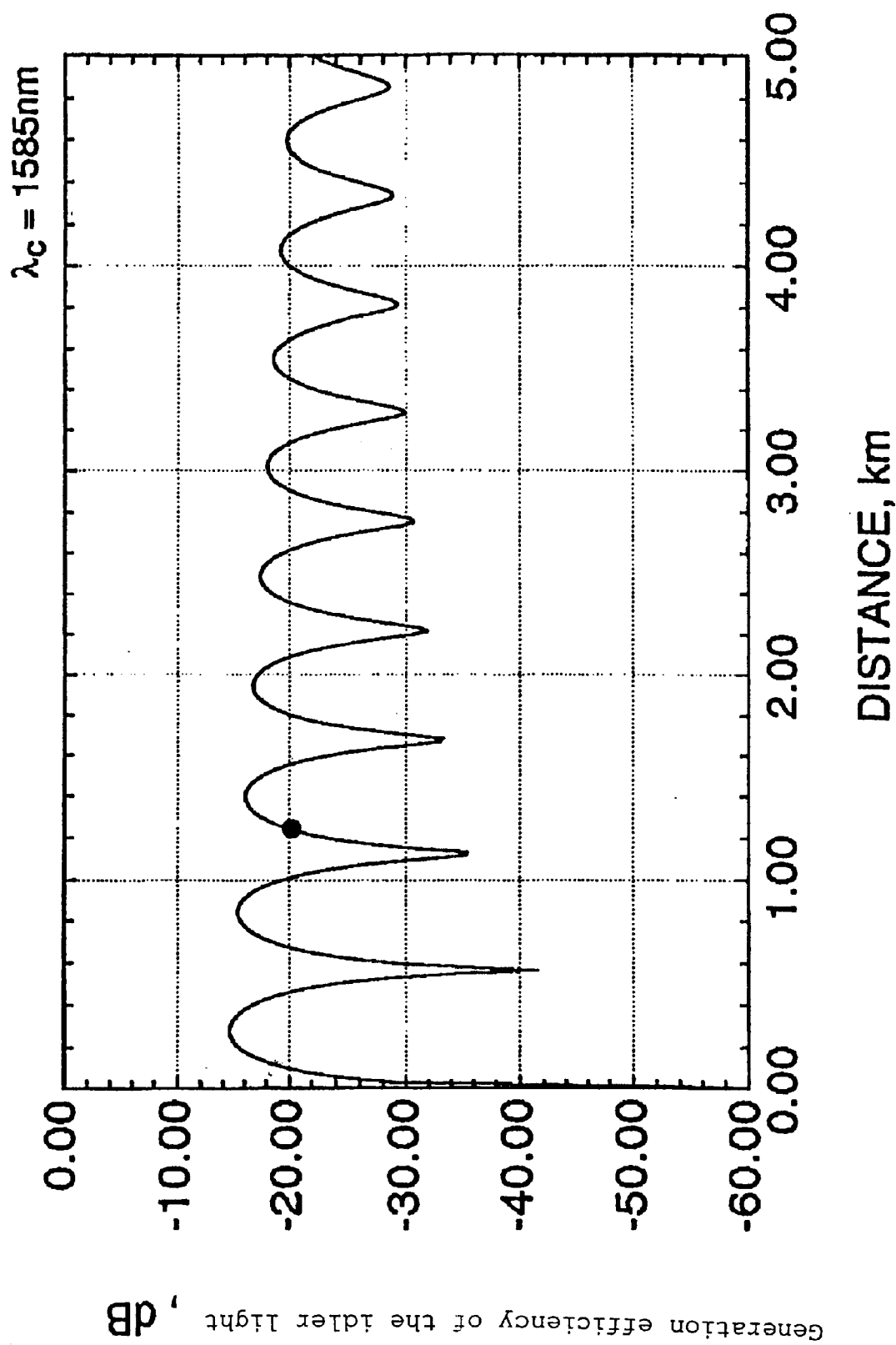
FIG. 16 is a view showing the characteristic plot of the conversion efficiency of idler light against the distance of an optical fiber in the longitudinal direction thereof with the optical fiber of a different length.
Figure 17:
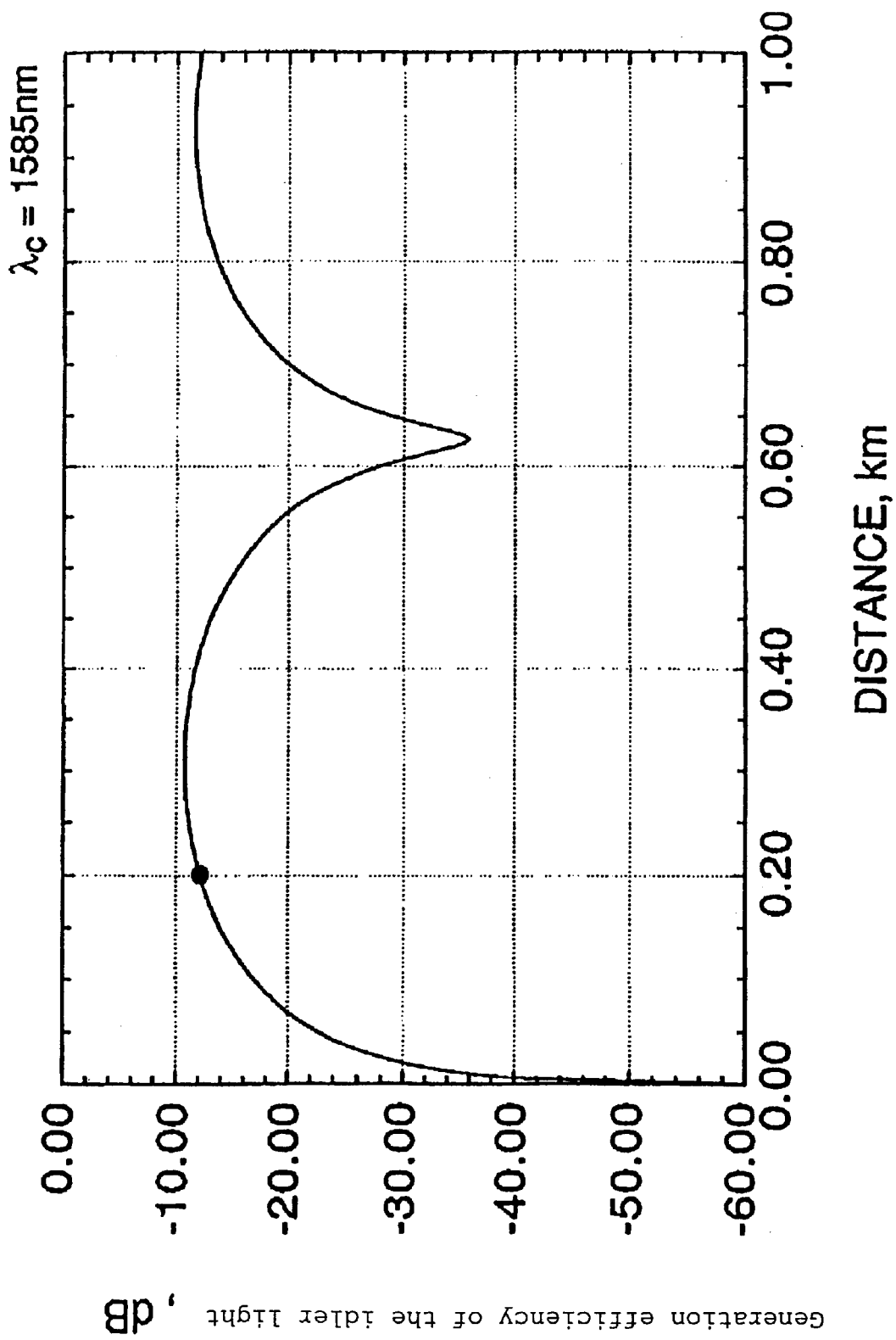
FIG. 17 is a view showing the characteristic plot of the conversion efficiency of idler light against the distance of an optical fiber in the longitudinal direction thereof with the optical fiber of a different length.

For the purpose of understanding this fact more schematically, with the same parameters used in the calculation shown in FIGS. 12–14, the process was calculated where the idler light, which the signal light set at a position 23 nm apart from the pumping light was converted to and which was thus generated, and grew in the longitudinal direction. FIGS. 15–17 show the results. In FIGS. 15–17, a wavelength conversion was considered in which the signal light-was set 20 nm apart from the pumping light. It can be seen in the most preferable result shown in FIG. 17 that the operation is carried out near the first peak among the series of peaks generated in the longitudinal direction. In FIG. 15, the effect of the loss becomes dominant and thus wavelength conversion can be no longer desired. In FIG. 16, wavelength conversion takes place near the third peak in the longitudinal direction. The same conversion efficiency can be obtained even with a fiber 200 m in length. If so, a fiber of a length of 200 m would provide less variations in dispersion in the longitudinal direction and less mismatching of the state of polarization between the pumping light and the signal light caused through propagation by birefringence. From this point, realizing a more desirable wavelength conversion was expected. In fact, the results of FIGS. 15 and 17 proved that this expectation was correct. Under the prospect according to FIG. 16, the fiber was cut to a length of 200 m. This caused the SBS threshold value to increase and made it possible to allow pumping light to be launched into the fiber up to 20 dBm. The frequency bandwidth reached 2.6 times or more than that of the system shown in FIG. 17. This shows that the length of a fiber is preferably shorter for the same conversion efficiency. Moreover, as can be seen in FIG. 17, a more highly efficient wavelength converter could be obtained by performing wavelength conversion in a system in which the length of fiber is set so as to be shorter than that of a fiber for the first peak. However, if pumping light of an output power below 20 dBm is used as continuous light, as can be seen from FIG. 17, making the length of a fiber 200 m or less would only result in a decreased conversion efficiency. In this sense, the lower limit obviously exists even in making the length of the fiber shorter. The value can be readily determined by numerical calculation.

Incidentally, the aforementioned method can be applied as it is to the design of OPA if a discussion is made with the conversion efficiency of the vertical axis in FIGS. 12–14 and FIGS. 15–17 replaced by the gain of a signal light.

FIG. 12 shows the measured result of the idler light conversion efficiency at a fiber length of 24.5 km. (The solid line shows the calculated result. A half width of the half maximum 0.85 nm.)

FIG. 13 shows the measured result of the idler light conversion efficiency at a fiber length of 1.2 km. (The solid line shows the calculated result. A half width of the half maximum 8.7 nm.)

FIG. 14 shows the measured result of the idler light conversion efficiency at a fiber length of 0.2 km. (The solid line shows the calculated result. A half width of the half maximum 23 nm.) Under these circumstances, the calculated result and the experimental result coincide with each other. They do agree with each other though parameters were chosen as such.

FIG. 15 shows the calculated result of the idler light conversion efficiency. Loss becomes a dominant for a fiber 24.5 km in length (which is denoted by ●). The calculation was carried out under a pumping light intensity of 10.0 dBm (corresponding to FIG. 12).

FIG. 16 shows the calculated result of the idler light conversion efficiency. The length of the fiber is 1.2 km (which is denoted by ●) and corresponds to around the third peak. The calculation was carried out under the power of the pumping light of 18.5 dBm (corresponding to FIG. 13). FIG. 17 shows the calculated result of the idler light conversion efficiency. The length of the fiber is 0.2 km (which is denoted by ●) and corresponds to around the first peak. The calculation was carried out under the intensity of the pumping light of 20.0 dBm (corresponding to FIG. 14).

Embodiment 6

Now, the implementation of a broadband wavelength converter with a bandwidth of 30 nm is considered. As an example, here, it is considered to perform wavelength conversion from the shorter wavelength side to the longer wavelength side across the pumping light. When an optical network is constructed in a transmission system employing the wavelength division multiplexing (WDM), it is necessary to convert optical signals multiplexed over a broad wavelength bandwidth simultaneously [4–7]. Discussion is made regarding the broadband simultaneous wavelength conversion at this time using numerical calculation. It is considered to set the intensity of pumping light to 20 dBm with the fiber being 200 m in length. It is to be understood that Table 3.1 gives fiber parameters.

| Parameters to be used for calculation of Embodiment 6 | |
| --- | --- |
| Parameter | Value |
| Zero-dispersion wavelength | 1549.0 nm |
| Dispersion slope | 0.030 ps/nm$^2$/km |
| Non-linear refractive index n2 | 3.2 × 10$^{-20}$ m$^2$/W |
| Effective core cross-sectional area Aeff | 12.57 μm$^2$ |
| Loss α | 0.50 dB/km |

Figure 18:
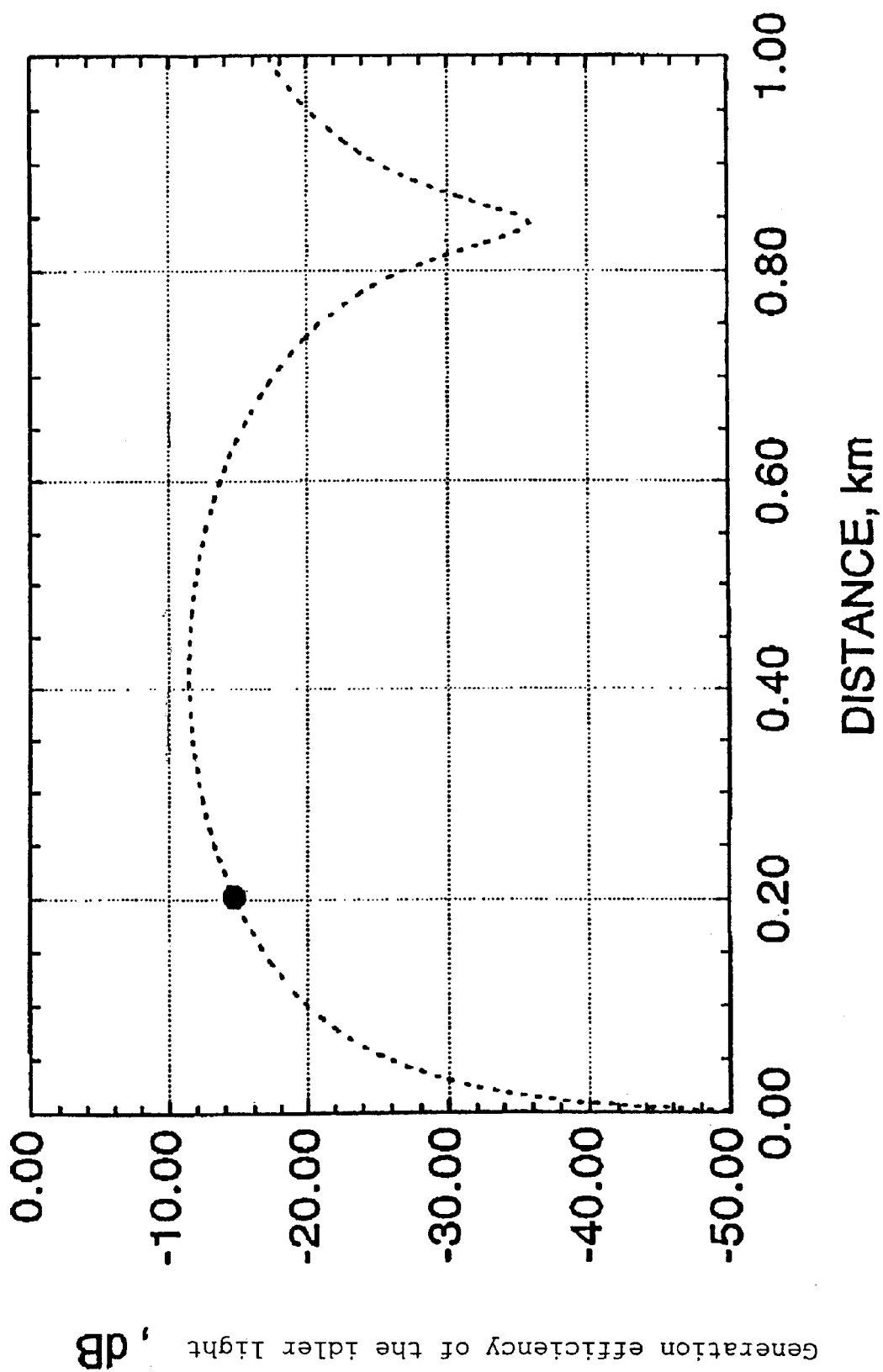
FIG. 18 is a view showing the characteristic plot of conversion efficiency in the case where signal light is set apart from pumping light by predetermined wavelengths.

The pumping light is to be set to 1550 nm. Here, as shown in Embodiment 5, the length is selected by solving equation 1 and thus showing the result of conversion efficiency in the longitudinal direction. At that time, design should be carried out using the wavelength that is farthest from the pumping light in the signal light bandwidth. FIG. 18 shows the calculated result with a wavelength 20 nm apart from the pumping light without considering that.

FIG. 18 shows the calculated result of conversion efficiency when the signal light is 20 nm apart from the pumping light. In the figure, "●" shows the case of 200 m.

The foregoing discussion shows that the system may be constructed near the first peak. According to this discussion, the optimum length of fiber is given at about 400 m. Therefore, to increase the pumping light can be considered, however, to shorten the fiber in length should not be considered.

Figure 19:
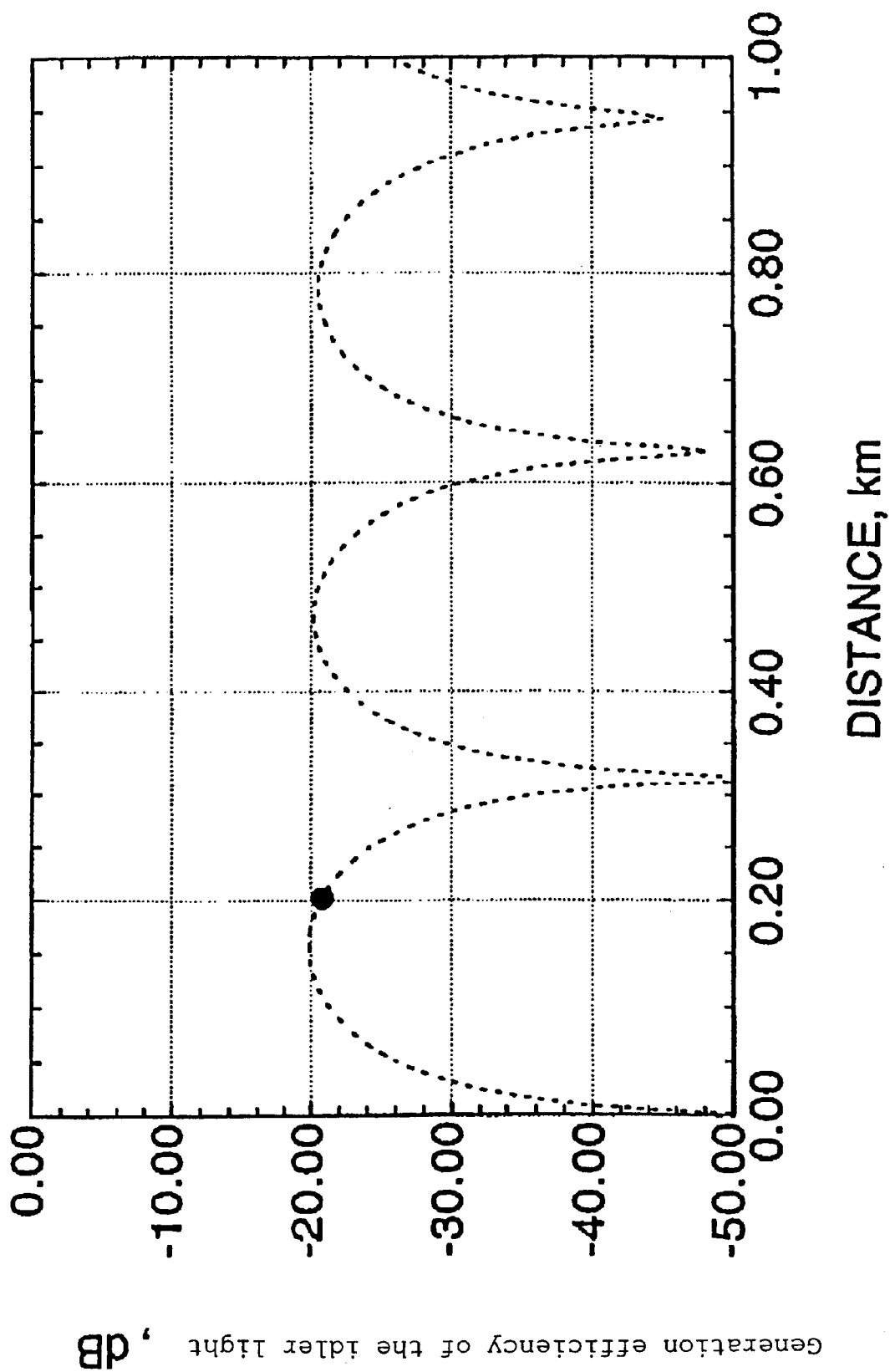
FIG. 19 is a view showing the characteristic plot of conversion efficiency in the case where signal light is set apart from pumping light by predetermined wavelengths.

Next, as can be found in the specification, FIG. 19 shows the calculated result in the case of a signal light set to a point 30 nm apart from the pumping light. As can be seen in the figure, the fiber of a length of 200 m has already exceeded the first peak. In consideration of this fact, the guideline of the present invention allows a fiber shorter in length (100 m in the figure) to be used, which would give the same value. The optimum fiber has a length of 150 m. That is, the result shown in FIG. 19 indicates that the fiber should be made much shorter.

Figure 20:
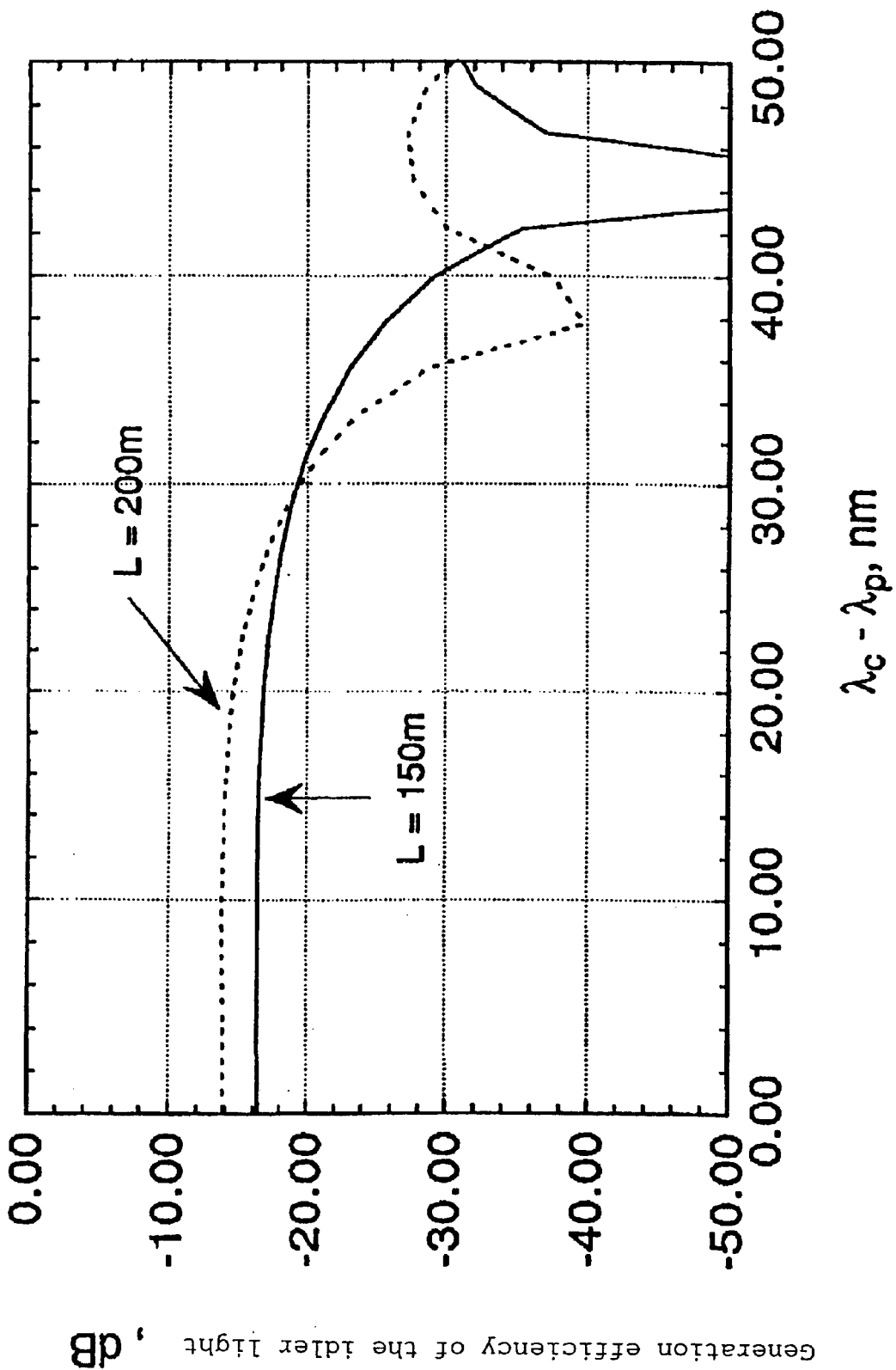
FIG. 20 is a view showing the characteristic plot of conversion efficiency against the difference in wavelength between pumping light and idler light.

To summarize the aforementioned results, FIG. 20 shows the conversion efficiencies for a fiber of a length L=200 m and a fiber of a length L=150 m.

FIG. 19 shows the calculated result of the conversion efficiency with the signal light being 30 nm apart from the pumping light. In the figure, "●" shows the case of 200 m.

FIG. 20 shows the calculated result of bandwidth spectrum by means of numerical calculation. The fiber of a length L=150 m (with a half width of the half maximum 30.0 nm) shown by a solid line can provide a wider bandwidth than the fiber of a length L=200 m (with a half width of the half maximum 26.0 nm) shown by a dashed line.

As can be seen from FIG. 20, the fiber of a length L=150 m can provide a bandwidth broader and a conversion efficiency flatter to wavelength than the fiber of a length L=200 m. As such, to implement the wavelength conversion over a broad bandwidth of 30 nm, it is necessary to carry out a design by placing the wavelength is λs=λp−30 nm of the signal light at the edge of the bandwidth for calculation.

It is possible to employ the aforementioned discussion as it is in the design of OPA.

Embodiment 7

Now, such a circumstance is considered in which the length of the fiber has to be adjusted due to the effect of PMD. At the time of carrying out wavelength conversion, the effect of PMD increases as the interval between the pumping light and the signal light is made larger. As has already been explained, it is possible to reduce the effect of PMD by applying the concept of the state of principal polarization. For this purpose, as shown in Embodiment 5, the length L of a fiber is determined only in consideration of FPM. Then, the optical fiber of a length L1 thus determined is evaluated in the same manner as is carried out in literature [22] for a conventional dispersion shifted optical fiber. Thus, the bandwidth $\Delta\lambda_{PSP}$ of the state of principal polarization of a highly nonlinear fiber at hand is evaluated. At this time, the wavelength is made the same as that of the pumping light. Then, the bandwidth $\Delta\lambda_{PSP}$ is compared with the bandwidth $\Delta\lambda_{WC}$ of the wavelength conversion, which is considered to be employed as the specification. If $\Delta\lambda_{WC}<\Delta\lambda_{PSP}$, the effect of PMD can be reduced only by making the polarization coincident with each other immediately before the pumping light and the signal light are incident on the fiber. Then, the wavelength conversion is thought about with the length of the fiber remaining as it is.

Embodiment 8

Figure 21:
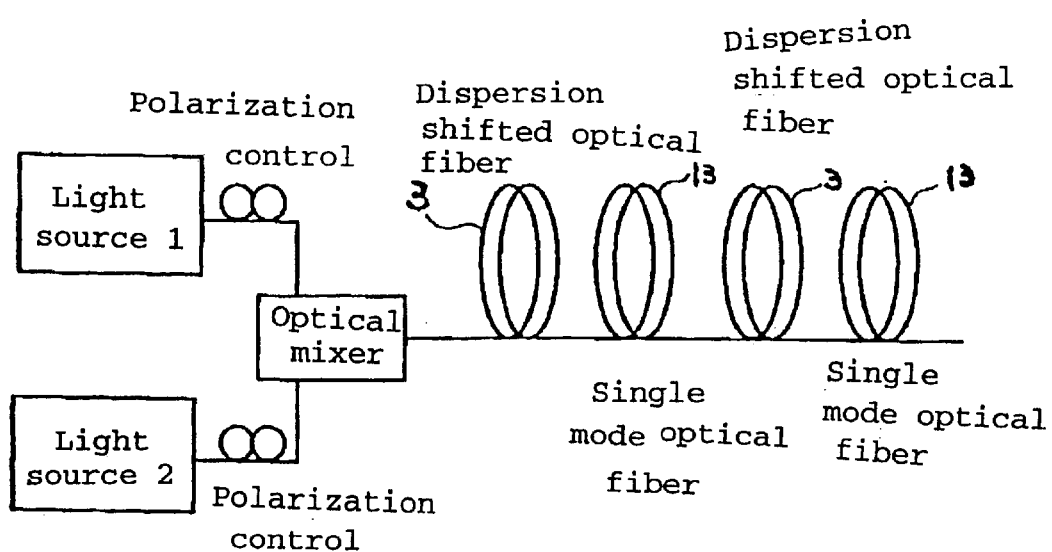
FIG. 21 is a view showing the configuration of an embodiment of a short-pulse generator according to the present invention.

FIG. 21 shows an embodiment of a short-pulse generator of the present invention. In the case where pumping light and probe light, which have different wavelengths but have substantially the same optical intensity, are allowed to be incident on a transmission line (comb-like dispersion-profiled fiber [26]) in which a dispersion shifted optical fiber 3 and a single mode optical fiber 13 are alternately connected as shown in the figure, beat signals of frequencies produced corresponding to the wavelength interval cause multiple four-wave mixing to develop in the dispersion shifted optical fiber that is disposed as the first fiber and thus the spectrum becomes dispersed. Here, the self phase modulation becomes dominant to cause frequency chirping to develop.

Letting the light of this dispersed spectrum into the single mode optical fiber causes the group velocity dispersion to become dominant, compressing the chirped pulse. By allowing the pulse to pass through many transmission lines comprising the dispersion shifted optical fibers and single mode optical fibers, the pulse repeats chirping and compression to be shaped into a short pulse in the shape of solutions, which had a sinusoidal waveform at the time of incidence.

To implement the foregoing technique, it is critical to allow four-wave mixing to develop with efficiency in a dispersion shifted optical fiber. Accordingly, the technique for producing the four-wave mixing according to the method described in the present invention can be used to implement a high-efficiency short-pulse generator.

If $\Delta\lambda_{WC}>\Delta\lambda_{PSP}$, the effect of PMD can be reduced by shortening the length of the fiber. In general, it is known that $\Delta\lambda_{PSP}$ simply reduces with respect to the fiber length [21, 22]. Accordingly, the condition $\Delta\lambda_{WC}<\Delta\lambda_{PSP}$ is implemented by shortening the length of the fiber. Suppose that the length of the fiber, which is determined by placing the first priority on the PMD, is L2 (L2≦L1). With this length of the fiber, the wavelength conversion is implemented.

At this time, if the intensity of the pumping light can be varied, it is also possible to optimize the system again so as to compensate for the shortened fiber.

References

[1] T. Yamamoto, T. Imai and M. Nakazawa, Optical wavelength converting circuit, Japanese Laid-open Patent Publication No. 133240 of 1998.
[2] T. Yamamoto and M. Nakazawa, IEICE Transaction on Electronics, J81-C-I, 1998, p. 148.
[3] T. Yamamoto and M. Nakazawa, Photonics Technology Letters, 9, 1997, p. 327.
[4] S. Watanabe, S. Takeda and T. Chikama, Technical Research Reports of Institute of Electronic Information and Communication Engineering Society, OCS98-62, 1998, p. 31.
[5] S. Watanabe, S. Takeda and T. Chikama, European Conference on Optical Communications 98, PD, 1998, p. 85.
[6] S. Takeda, S. Watanabe, CT. Ishikawa, H. Ooi, Technical Research Report of Institute of Electronic Information and Communication Engineering Society, OCS97-88, 1997, p. 19.
[7] S. Watanabe, Third Optoelectronics and Communications Conference Technical Digest, 14A-1, 1998, p. 84.
[8] R. Stolen and J. E. Bjorkholm, Journal of Quantum Electronics, QE-18, 1982, p. 1062.
[9] G. P. Agrawal, "Nonlinear Fiber Optics, Second Edition", Academic Press, SanDiego, Calif., USA, 1995.
[10] M. E. Marhic, N.Kagi, T.-K. Chiang and L. G. Kazovski, Optics Letters, 21, 1996, p. 573.
[11] M. E. Marhic, Y. Park, F. S. Yang and L. G. Kazovski, Optics Letters, 21, 1996, p. 1354.
[12] H. Nakamoto, Optical signal reproducing circuit, Japanese Laid-open Patent Publication No. 83447 of 1997.
[13] T. Sakano, A. Oteru, T. Matsumoto, Multiple wavelength light rsource and Optical wavelength-multiplexed signal generating circuit, Japanese Laid-open Patent Publication No. 288930of 1996.
[14] N. Kagi, T.-K.Chiang, M. E. Marhic and L. G. Kazovsky, Electronics Letters, 31, 1995, p. 1935.
[15] S. Arai, Y. Akasaka, R. Sugizaki and T. Kamiya, First Optoelbctronics and Communications Conference Technical Digest, 17P-33, 1996, p. 276.
[16] T. Okuno, M. Onishi, T. Kashiwada, M. Nishimura, Technical Research Report of Electronic Information Communication Society, OCS97-89, 1997, p. 25.
[17] M. Onishi, T. Okuno, T. Kashiwada, S. Ishikawa, N. Akasaka and M. Nishimura, Optical Fiber Technologies, 4, 1998, p. 204.
[18], K. Inoue, Journal of Quantum Electronics, 28, 1992, p. 883.
[19] C. D. Poole and R. E. Wagner, Electronics Letters, 22, 1986, p. 1029.
[20] O. Aso and H. Nakamura, Electronics Letters, 32, 1996, p. 5718.
[21] S. Betti, F. Curti, B. Diano, G. De Marchis, E. Iannnone and F. Matera, Optics Letters, 16, 1991, p. 467.
[22] O. Aso, Optics Letters, 23, 1998, p. 1102.
[23] G. Cappellini and S. Trillo, Journal of the Optical Society of America B, 8, 1991, p. 824.
[24] K. O. Hill, D. C. Johnson, B. S. Kawasaki and R. I. MacDonald, Journal of Applied Physics, 49, 1978, p. 5098.
[25] C. D. Poole and G. R. Giles, Optics Letters, 13, 1988, p. 155.
[26] S. V. Chernikov, J. R. Taylor and R. Kashyap, Opt. Lett., 19, 19194, p. 539.

What is claimed is:

1. A method for generating four-wave mixing in an optical fiber, in which probe light fs and pumping light fp, both set on a frequency axis on condition of fp≠fs, are launched into the optical fiber to generate the four-wave mixing in the optical fiber, wherein allength z of said optical fiber is adapted to satisfy Lmin≦z≦Lmax, the Lmin and Lmax being determined by the following A and B;

wherein,
A: nonlinear ordinary differential equations for describing the four-wave mixing in an optical fiber are to be given by $$(dE_p/dz)+(1/2)\alpha E_p = i\gamma[(|E_p|^2+2|E_s|^2+2|E_c|^2)E_p+2E^*_p E_s E_c \exp(i\Delta\beta z)] \quad (2.1)$$

$$(dE_s/dz)+(1/2)\alpha E_s = i\gamma[(|E_s|^2+2|E_c|^2+2|E_p|^2)E_s+E^*_c E_p^2 \exp(-i\Delta\beta z)] \quad (2.2)$$

$$(dE_c/dz)+(1/2)\alpha E_c = i\gamma[(|E_c|^2+2|E_p|^2+2|E_s|^2)E_s+E^*_s E_p^2 \exp(i\Delta\beta z)] \quad (2.3)$$

where E denotes an electric field,
subscripts p, s, and c denote the pumping light, the signal light (the probe light), and wavelength converted light (idler light),
α denotes loss of the optical fiber per unit distance,
γ denotes a non-linear coefficient,
γ satisfyng a relationship among a pumping light wavelength $\gamma_p$, nonlinear refractive index $n_2$, and effective area Aeff, $$\gamma=(2\pi/\lambda_p)\cdot(n_2/Aeff)z \quad (3),$$

Δβ being phase mismatching of a propagation constant and satisfying a phase matching condition in terms of frequency given by $$2\omega_p=\omega_s+\omega_c \quad (4),$$

where ω is an angular frequency, having a relationship of ω=2 πf with frequency f, and Δβ also satisfying the following equation, $$\Delta\beta(\omega_s)=(\lambda_p^2/2\pi c)\,D(\lambda_p)(\omega_s-\omega_p)^2 \quad (5),$$

where D is a chromatic dispersion coefficient of the optical fiber, the coefficient being normally expressed in ps/nm·km unit, and c is the speed of light in vacuum, wherein,
said differential equations are integrated over the entire length of the optical fiber L with respect to Es and Ec with accuracy of calculation of an error equal to or less than 0.1% along the coordinate z in the longitudinal direction of the fiber, and a resulting absolute value is squared to determine the corresponding optical power Ps(z) and Pc(z),
using the solutions, conversion efficiency Gc of the idler light is calculated by a ratio of idler light intensity Pc(L) measured at an output end of the fiber to intensity Ps(0) of the probe light at an input end of the fiber,
probe light gains Gs are calculated by a ratio of probe light intensity Ps(L) measured at the output end ofthe fiber to probe light intensity Ps(0) at the input end of the fiber, the Ps and Pc being the probe light intensity and the idler light intensity, respectively, which are expressed by functions with a distance from the input end of the fiber,
L being an entire length of the fiber in question,
the calculated probe light gains Gs are plotted with the horizontal axis representing distance z and the vertical axis representing the probe light gain or idler light conversion efficiency, Allowing z of a target quantity for calculation to take on a sufficiently large finite value that to cause variations in the longitudinal direction of the conversion efficiency of the idler light to oscillate periodically as a general property of the solutions letting z=Lm for the smallest value of z among the values of z by which the solutions take on maximal values due to periodic behavior,
letting z=Lmax for a distance satisfying a condition of z>Lm and 10% longer than Lm, B:
next, as for aforementioned equations (2.1)–(2.3), two different approximate solutions are known under appropriate conditions,
idler light conversion efficiency Gc is given by a ratio of idler light intensity Pc(L) measured at the output end of the fiber to probe light intensity Ps(0) at the input end of the fiber,
probe light gains Gs is given by a ratio of probe light intensity Ps(L) measured at the output end of the fiber to probe light intensity Ps(0) at the input end of the fiber,
the Ps and Pc being the probe light intensity and the idler light intensity, respectively, which are expressed by functions with an argument of distance from the input end of the fiber,
L being an entire length of the fiber in question,
with only results being shown, signal light gain Gs and idler light generating efficiency Gc, which are obtained by respective approximate solutions, are expressed as follows,
(a) First Solution
(a.1) for $4\gamma P_p > -\Delta\beta$, $$Gs=1+\gamma^2 P_p^2(0)L^2[(\sin h\,([g_n]g_a L)/g_a L]^2 \quad (6.1.1.a),$$

$$Gc=\gamma^2 P_p^2(0)L^2[(\sin (g_a L)/g_a L]^2 \quad (6.1.1.b),$$

where $$g_a=(1/2)[\Delta\beta(\Delta\beta+4\gamma P_p)]^{1/2} \quad (6.1.2),$$

next,
(a.2) for $4\gamma P_p < -\Delta\beta$, $$Gs=1+\gamma^2 P_p^2(0)L^2[(\sin h\,(g_b L)/g_b L]^2 \quad (6.2.1.a),$$

$$Gc=\gamma^2 P_p^2(0)L^2[(\sin h\,(g_b L)/g_b L]^2 \quad (6.2.1.b),$$

where $$G_b=(1/2)[\Delta\beta(\Delta\beta,+4\gamma P_p)]^{1/2} \quad (6.2.2),$$

(b) Second solution;

$$G_s=P_s(L)/P_s(0)=\exp(-\alpha L) \quad (7.1)$$

$$G_c=P_c(L)/P_s(0)=\gamma^2 P_p^2(0)e^{-\alpha L}\{(1-e^{-\alpha L})^2+e^{-\alpha L}\sin^2(\Delta\beta L/2)\}/(\alpha^2+\Delta\beta^2)$$

plotting the calculated results, with the horizontal axis representing distance z and the vertical axis representing Gc
selecting the greatest value of distance z such that any of the solutions obtained by solving equations (2.1)–(2.3) numerically, the equations (6.1.1.a) and (6.1.1.b), the equations (6.2.1.a) and (6.2.1.b), and the equations 7.1 and 7.2 produce differences not less than 1% which are greater than the calculation error, and
setting z=Lmin.
2. A method for generating four-wave mixing in an optical fiber according to claim 1, wherein
when the pumping light and the signal light, of which states of polarization are made to coincide at the time of being launched into the optical fiber, propagate the fiber, the fiber is set a one shorter in length enough to avoid effects of depolarization or dispersion.

3. The method for generating four-wave mixing in an optical fiber according to claim 1, wherein said method provides a wavelength converter function.

4. The method for generating four-wave mixing in an optical fiber according to claim 2, wherein said method provides a wavelength converter function.

5. The method for generating four-wave mixing in an optical fiber according to claim 1, wherein said method provides an optical parametric amplifier function.

6. The method for generating four-wave mixing in an optical fiber according to claim 2, wherein said method provides an optical parametric amplifier function.

7. The method for generating four-wave mixing in an optical fiber according to claim 1, wherein said method provides an optical phase conjugator function.

8. The method for generating four-wave mixing in an optical fiber according to claim 2, wherein said method provides an optical phase conjugator function.

9. The method for generating four-wave mixing in an optical fiber according to claim 1, wherein said method provides an optical signal regeneration circuit function.

10. The method for generating four-wave mixing in an optical fiber according to claim 2, wherein said method provides an optical signal regeneration circuit function.

11. The method for generating four-wave mixing in an optical fiber according to claim 1, wherein said method provides a multi-wavelength optical source function.

12. The method for generating four-wave mixing in an optical fiber according to claim 2, wherein said method provides a multi-wavelength optical source function.

13. A short-pulse generator in which pumping light and probe light are inputted to a transmission line in which a dispersion shifted optical fiber and a single mode optical fiber are concatenated alternately, a multiple of four-wave mixing are generated in the dispersion shifted optical fiber to cause frequency chirping having broadened spectrum to be generated in which self phase modulation is dominant, and the spectrally broadened pulse is compressed in time domain by the following single-mode fiber by repeating this, short pulses in the shape of solutions are generated, wherein
the four-wave mixing method according to claim 1 is used in said dispersion shifted optical fiber.

14. A short-pulse generator in which pumping light and probe light are inputted to a transmission line in which a dispersion shifted optical fiber and a single mode optical fiber are connected alternately, a multiple of four-wave mixing are generated in the dispersion shifted optical fiber to cause frequency chirping having a broadened spectrum to be generated in which self phase modulation is dominant, and the spectrally broadened pulse is compressed in time domain by the following single-mode fiber, by repeating this procedure, short pulses in the shape of soliton are generated, wherein
the four-wave mixing method according to claim 2 is used in said dispersion shifted optical fiber.

* * * * *